US009140776B2

United States Patent
Higgison et al.

(10) Patent No.: US 9,140,776 B2
(45) Date of Patent: Sep. 22, 2015

(54) ASSISTED POSITIONING SYSTEMS

(75) Inventors: Thomas Lennox Higgison, Edinburgh (GB); Nitin Chaudhary, Edinburgh (GB); Zankar Upendrakumar Sevak, Edinburgh (GB); Tughrul Sati Arslan, Edinburgh (GB)

(73) Assignee: SENSEWHERE LIMITED, Edinburgh (GB)

( * ) Notice: Subject to any disclaimer, the term of this patent is extended or adjusted under 35 U.S.C. 154(b) by 250 days.

(21) Appl. No.: 13/127,583

(22) PCT Filed: Nov. 4, 2009

(86) PCT No.: PCT/GB2009/051484
§ 371 (c)(1),
(2), (4) Date: Sep. 7, 2011

(87) PCT Pub. No.: WO2010/052496
PCT Pub. Date: May 14, 2010

(65) Prior Publication Data
US 2012/0116677 A1    May 10, 2012

(30) Foreign Application Priority Data

Nov. 4, 2008  (GB) .................................. 0820163.4
Nov. 4, 2008  (GB) .................................. 0820168.3
Apr. 14, 2009 (GB) .................................. 0906351.2

(51) Int. Cl.
*G01S 5/00* (2006.01)
*G01S 19/25* (2010.01)
*G01C 21/00* (2006.01)

(52) U.S. Cl.
CPC ............. *G01S 5/0072* (2013.01); *G01S 5/0027* (2013.01); *G01S 19/25* (2013.01)

(58) Field of Classification Search
USPC .......... 701/400, 412, 468–470, 518; 340/988; 342/350, 357.22–357.24
See application file for complete search history.

(56) References Cited

U.S. PATENT DOCUMENTS 6,950,058 B1   9/2005   Davis et al.
7,495,609 B1   2/2009   Woo et al.
(Continued)

FOREIGN PATENT DOCUMENTS

EP   1 754 980      2/2007
EP   1 754 980 A1   2/2007
(Continued)

OTHER PUBLICATIONS

Examination Report (5 pgs.) dated Mar. 5, 2013 issued in corresponding European Application No. 09 760 564.6.
International Search Report for PCT/GB2009/051484, mailed Apr. 7, 2010.
(Continued)

*Primary Examiner* — Yonel Beaulieu
(74) *Attorney, Agent, or Firm* — Nixon & Vanderhye PC

(57) ABSTRACT

A position determining unit has an assistance data processing and relaying module (software client) (1318) that obtains localized assistance data, such as Global Navigation Satellite Systems (GNSS) assistance data and/or non-GNSS (such as Wireless Positioning System) assistance data, from an assisting peer position determining unit and relays the localized assistance data to an assisted peer position determining unit. The relaying may be done via an assistance server. In a relaying GNSS position determining unit, such as a GPS receiver, the chip (1310) architecture has multi-frequency GNSS baseband (1311), GSM or UMTS baseband (1312) for long range communication and short range baseband (1313) such as Bluetooth or Wi-Fi or UWB. The assistance data generating module (1316) generates localized assistance data at the relaying GNSS unit from the GNSS R.F. front end and/or GNSS baseband and/or microcontroller running the GNSS solutions software portion. The assistance data feed module (1317) supplies assistance data to any combination of the main modules of the GNSS position determining unit. The supplied assistance data may originate in the relaying GNSS unit itself or the assisting GNSS unit.

79 Claims, 11 Drawing Sheets

(56) References Cited

U.S. PATENT DOCUMENTS

| | | | |
|---|---|---|---|
| 8,099,235 B2* | 1/2012 | Loftus et al. | 701/409 |
| 8,138,970 B2* | 3/2012 | Whitehead et al. | 342/357.27 |
| 8,144,008 B2* | 3/2012 | Furey et al. | 340/539.13 |
| 8,350,755 B2* | 1/2013 | Abraham et al. | 342/357.42 |
| 2007/0159388 A1 | 7/2007 | Allison et al. | |
| 2008/0177430 A1* | 7/2008 | Tekawy et al. | 701/13 |
| 2009/0079622 A1 | 3/2009 | Seshadri et al. | |
| 2009/0121932 A1* | 5/2009 | Whitehead et al. | 342/357.12 |
| 2010/0117899 A1* | 5/2010 | Papadimitratos et al. | 342/357.12 |
| 2010/0324813 A1 | 12/2010 | Sundararajan et al. | |
| 2011/0068973 A1* | 3/2011 | Humphreys et al. | 342/357.3 |

FOREIGN PATENT DOCUMENTS

| | | |
|---|---|---|
| GB | 2 410 653 A | 8/2005 |
| WO | WO 2005/072362 | 8/2005 |
| WO | WO 2006/043123 | 4/2006 |
| WO | 2006/057811 | 6/2006 |
| WO | 2007/018790 | 2/2007 |
| WO | 2010/075369 | 7/2010 |
| WO | 2011/047310 | 4/2011 |

OTHER PUBLICATIONS

Written Opinion of the International Searching Authority for PCT/GB2009/051484, mailed Apr. 7, 2010.

* cited by examiner

ASSISTED POSITIONING SYSTEMS

This application is the U.S. national phase of international Application No. PCT/GB2009/051484, filed 4 Nov. 2009, which designated the U.S. and claims priority to GB Application No. 0820163.4, filed 4 Nov. 2008; GB Application No. 0820168.3, filed 4 Nov. 2008; and GB Application No. 0906351.2, filed 14 Apr. 2009, the entire contents of each of which are hereby incorporated by reference.

This invention relates to assistance data for position determining units, such as found in Global Navigation Satellite Systems (GNSS) and Wireless Positioning Systems (WPS), in particular processing and communication of assistance data.

BACKGROUND

Diverse ranges of electronic devices are increasingly making use of positioning information to deliver new services to users. Technologies such as satellite positioning systems, Inertial Navigation Systems (INS), Wi-Fi Positioning System, transmitter signal strength measurement, and motion sensors, are all used separately or in combination to provide location information to a wide range of devices including mobile phones, personal navigation devices, laptops, netbooks, in-car telematics etc. In particular, Location Based Services (LBS) are now a common feature available on mobile devices.

One of the most ubiquitous location technologies in recent years has been the GPS (Global Positioning System) that is the United States' positioning and navigation system primarily developed as military system but which is being popularly used by civilians all across the globe for positioning, timing, navigation and many other purposes. It contains numerous orbiting satellites around the globe in the different planes that transmit their positions with corrections, timing information and other useful data. All the satellites involved in the system have different identity in the forms of different transmission codes. The system is designed in such a way that users on the surface of the earth or up to a certain distance above it (this distance is limited by the height of the satellite planes) can at any time, given unobstructed visibility of the sky, see four or more satellites. Measurement of the time and phase differences among the four or more satellite signals reaching the receiver are used to uniquely and unambiguously determine the position of the user receiver.

The ability of the user receiver to calculate an accurate position is influenced by many error sources such as errors in satellite orbit positions (ephemeris), satellite and user clock inaccuracies, ionosphere and troposphere signal propagation effects, and local environment errors due to multipath signal reception and receiver measurement errors.

Differential correction techniques have been devised to minimise many of the major sources of errors. A fixed reference receiver or a network of receivers, with precisely known position, measure their pseudo-ranges from the visible satellites and derive a measure of the common mode atmospheric, ephemeris and satellite clock errors. These error measurements in the form of corrections are transmitted to the user receiver in the appropriate regions, either through local ground based communication links or through geostationary satellites. The latter system is the SBAS (Satellite Based Augmentation System) comprising of WAAS (Wide Area Augmentation System) in the U.S., EGNOS (European Geostationary Navigation Overlay Service) in Europe and several others.

When the user receiver does not have direct line of sight to four or more satellites, a situation which is very common in urban areas, indoors, multi-storey car-parks and under vegetation canopies, it will fail to obtain a position and navigation fix because of the very low signal to noise ratio. To assist users in these circumstances, a technology called Assisted GPS (AGPS) has been developed where useful information like ephemeris, almanac and sometimes precise timing information is transmitted to users through mobile phone networks to assist them in obtaining a lock on the satellites. AGPS has many variations and many proprietary techniques but almost all of them require some sort of communication link to mobile network service providers or links to the internet to deliver assistance data.

In known AGPS, an AGPS service provider has a network of many fixed reference GPS receivers across the globe. All these fixed reference stations continuously track all of the GPS satellites and the tracking information is fed back to the network assistance server where assistance data such as ephemeris, almanac, clock correction, Doppler offset etc. are derived. These data are then provided to the Mobile Service Operator upon request and transmitted to the end user. This method is standardised and known as Secure User Plane (SUPL) AGPS. Delays in broad adoption of the standard, data overhead, roaming and out of coverage issues still limit SUPL AGPS from becoming a ubiquitous solution.

Another technique called Real Time Kinematic (RTK) satellite navigation uses carrier phase measurements of the GNSS signals with a single fixed reference station providing real-time corrections to increase positioning accuracy. The connection from the fixed reference (or control) station to the GNSS rover receiver may be via a direct radio link. The Virtual Reference Station (VRS) technique adds to RTK with a network of fixed reference stations.

Post-processed second generation AGPS solutions, often referred to as predictive or extended ephemeris, use a server to synthesize assistance data. Valid for a week, or even a month into the future, this GPS assistance data is downloaded to an AGPS mobile device in advance. These solutions require frequent ephemeris downloads/updates with size varying from 2 k to 200 Kbytes, involve processing overheads and are exempt from other GPS assistance information i.e. time, coarse position estimates, ionospheric corrections etc.

It is also known that a plurality of GPS enabled devices can communicate to share satellite data residing on only one of the devices, so that a device otherwise with insufficient information to derive a position can augment its GPS solution by receiving assistance from another device already in possession of that additional information. In this known art, GPS enabled devices each with similar functionality, for example a group of mobile handsets, can form networks in order to share position and assistance data.

So, a network of similar GPS enabled devices would theoretically be able to share GPS assistance data and hence augment their LBS capability, but since the peer to peer connections are generally over short range communication links, for practical use in the current state of the art, there will not be a sufficient critical number of users within communication range. There is then a low probability of successfully linking with another device and the advantages of sharing GPS assistance information is lost. In addition, it is known that a range of technologies are used to offer positioning and navigation data as a compliment to GPS, to enhance precision and improve service coverage, but this additional position data is generated and consumed at a device level and not made available to a wider network.

According to a first aspect of the present invention, there is provided an assistance data processing and relaying module for a relaying position determining unit wherein the assistance data processing and relaying module is operable to obtain localised assistance data from an assisting peer position determining unit and is further operable to relay the localised assistance data to an assisted peer position determining unit.

Preferably, the localised assistance data comprises non-GNSS (Global Navigation Satellite System) assistance data.

Preferably, the non-GNSS assistance data comprises Wireless Positioning System (WPS) assistance data.

Preferably, the localised assistance data comprises GNSS assistance data.

Preferably, the localised assistance data comprises data derived from measurements by the assisting peer position determining unit in a locality of the assisted peer position determining unit.

Preferably, the assistance data processing and relaying module is operable to obtain the localised assistance data directly from the assisting peer position determining unit over a local wireless link.

Preferably, the assistance data processing and relaying module is operable to obtain the localised assistance data from the assisting peer position determining unit via an assistance server.

Preferably, the assistance data processing and relaying module is operable to relay the localised assistance data to the assisted peer position determining unit via an assistance server.

Preferably, the assistance data processing and relaying module is operable to form a first peer to peer network with another peer position determining unit and to cause the other peer position determining unit to establish a second peer to peer network for the other peer position determining unit to obtain the localised assistance data.

Preferably, the assistance data processing and relaying module further comprises an assistance data feed module operable to supply assistance data to a positioning, timing and navigation engine of the relaying position determining unit.

Preferably, the assistance data processing and relaying module further comprises an assistance data generating module operable to generate additional localised assistance data at the relaying position determining unit.

Preferably, the assistance data processing and relaying module is also operable to transmit the generated additional localised assistance data to the assisted peer position determining unit.

Preferably, the generated additional localised assistance data comprises data derived from measurements performed by the relaying position determining unit.

Preferably, the assistance data processing and relaying module is operable to transmit the generated additional localised assistance data to the assisted peer position determining unit over a local wireless link.

Preferably, the assistance data processing and relaying module is operable to transmit the generated additional localised assistance data to the assisted peer position determining unit via an assistance server.

According to a second aspect of the present invention, there is provided a position determining unit comprising the assistance data processing and relaying module of the first aspect.

Preferably, the position determining unit is operable to form a cluster with one or more peer position determining units in which the clustered position determining units exchange cluster assistance data with each other.

Preferably, the position determining unit is operable to select preferred assistance data available within the cluster.

Preferably, the position determining unit is operable to compare the generated additional localised assistance data with the cluster assistance data, to determine if the cluster assistance data may be enhanced and to cause the modification of the cluster assistance data responsive to the generated additional localised assistance data.

Preferably, the position determining unit is further operable to assume a special role in the cluster to arbitrate changes to the cluster assistance data.

Preferably, in the special role, the position determining unit communicates assistance data with an assistance server.

Preferably, the position determining unit is further operable to act as a repository for local geospatially relevant data.

According to a third aspect of the present invention, there is provided a method of processing assistance data at a relaying position determining unit, the method comprising the steps of obtaining localised assistance data from an assisting peer position determining unit and relaying the localised assistance data to an assisted peer position determining unit.

Preferably, the localised assistance data comprises non-GNSS assistance data.

Preferably, the non-GNSS assistance data comprises WPS assistance data.

Preferably, the localised assistance data comprises GNSS assistance data.

Preferably, the localised assistance data comprises data derived from measurements by the assisting peer position determining unit in a locality of the assisted peer position determining unit.

Preferably, the localised assistance data is obtained directly from the assisting peer position determining unit over a local wireless link.

Preferably, the localised assistance data is obtained from the assisting peer position determining unit via an assistance server.

Preferably, the localised assistance data is relayed to the assisted peer position determining unit via an assistance server.

Preferably, the method further comprises the step of generating additional localised assistance data at the relaying position determining unit.

Preferably, the generated additional localised assistance data comprises data derived from measurements performed by the relaying position determining unit.

Preferably, the method further comprises the step of transmitting the generated additional localised assistance data from the relaying position determining unit to the assisted peer position determining unit.

Preferably, the step of transmitting the generated additional localised assistance data comprises transmitting from the relaying position determining unit to the assisted peer position determining unit over a local wireless network link.

Preferably, the step of transmitting the generated additional localised assistance data comprises transmitting from the relaying position determining unit to the assisted peer position determining unit via an assistance server.

According to a fourth aspect of the present invention, there is provided a method of exchanging assistance data comprising the steps of forming a cluster of a plurality of peer position determining units and exchanging cluster assistance data between the clustered position determining units in accordance with the method of the third aspect.

Preferably, the method further comprises the step of selecting preferred assistance data available within the cluster for a clustered position determining unit.

Preferably, the method further comprises the step of comparing localised assistance data generated by a clustered position determining unit with the cluster assistance data, to determine if the cluster assistance data may be enhanced and to cause the modification of the cluster assistance data responsive to the generated localised assistance data.

Preferably, the method further comprises the step of operating a position determining unit to assume a special role in the cluster to arbitrate changes to the cluster assistance data.

Preferably, the method further comprises the step of the position determining unit operated in the special role communicating assistance data with an assistance server.

Preferably, the method further comprises the step of operating the position determining unit as a repository for local geospatially relevant data.

According to a fifth aspect of the present invention, there is provided an assistance data receiving module for an assisted position determining unit wherein the assistance data receiving module is operable to obtain localised assistance data from an assisting peer position determining unit via an assistance server.

Preferably, the localised assistance data comprises non-GNSS assistance data.

Preferably, the non-GNSS assistance data comprises WPS assistance data.

Preferably, the localised assistance data comprises GNSS assistance data.

Preferably, the localised assistance data comprises data derived from measurements by the assisting peer position determining unit in a locality of the assisted position determining unit.

According to a sixth aspect of the present invention, there is provided an assistance data transmitting module for an assisting position determining unit wherein the assistance data transmitting module is operable to develop localised assistance data and to transmit the localised assistance data to an assisted peer position determining unit via an assistance server.

Preferably, localised assistance data comprises non-GNSS assistance data.

Preferably, the non-GNSS assistance data comprises WPS assistance data.

Preferably, the localised assistance data comprises GNSS assistance data.

Preferably, the localised assistance data comprises data derived from measurements performed by the assisting position determining unit.

According to a seventh aspect of the present invention, there is provided a server module for a server, wherein the server module is operable to receive localised assistance data from a plurality of mobile assisting position determining units each having the assistance data transmitting module according to the sixth aspect and to transmit the localised assistance data to an assisted position determining unit having the assistance data receiving module according to the fifth aspect.

Preferably, the server module is operable to select suitable localised assistance data for transmission to the assisted position determining unit in case of similar localised assistance data reception from a multiplicity of the assisting position determining units.

Preferably, the server module is operable to provide and/or enable location based services responsive to the received localised assistance data.

According to an eighth aspect of the present invention, there is provided a position determining unit comprising the assistance data receiving module according to the fifth aspect and the assistance data transmitting module according to the sixth aspect.

Preferably, the position determining unit is a GNSS roving receiver.

Preferably, the position determining unit is a personal mobile device.

Preferably, the position determining unit is operable to form a cluster with one or more peer position determining units in which the clustered position determining units exchange cluster assistance data with each other.

Preferably, the position determining unit is operable to select preferred assistance data available within the cluster.

Preferably, the position determining unit is operable to compare the localised assistance data it has developed with the cluster assistance data, to determine if the cluster assistance data may be enhanced and to cause the modification of the cluster assistance data responsive the localised assistance data it has developed.

Preferably, the position determining unit is further operable to assume a special role in the cluster to arbitrate changes to the cluster assistance data.

Preferably, in the special role, the position determining unit communicates assistance data with an assistance server.

Preferably, the position determining unit is further operable to act as a repository for local geospatially relevant data.

According to a ninth aspect of the present invention, there is provided a method of receiving assistance data at an assisted position determining unit comprising the step of obtaining localised assistance data from an assisting peer position determining unit via an assistance server.

Preferably, the localised assistance data comprises non-GNSS assistance data.

Preferably, the non-GNSS assistance data comprises WPS assistance data.

Preferably, the localised assistance data comprises GNSS assistance data.

Preferably, the localised assistance data comprises data derived from measurements by the assisting peer position determining unit in a locality of the assisted peer position determining unit.

According to a tenth aspect of the present invention, there is provided a method of providing assistance data from a transmitting position determining unit, the method comprising the steps of developing localised assistance data and transmitting the localised assistance data from the transmitting position determining unit to an assisted peer position determining unit via an assistance server.

Preferably, the localised assistance data comprises non-GNSS assistance data.

Preferably, the non-GNSS assistance data comprises WPS assistance data.

Preferably, the localised assistance data comprises GNSS assistance data.

Preferably, the localised assistance data comprises data derived from measurements performed by the transmitting position determining unit.

According to an eleventh aspect of the present invention, there is provided a method of exchanging assistance data comprising the steps of forming a cluster of a plurality of peer position determining units and exchanging cluster assistance data between the clustered position determining units in accordance with the method of the ninth or tenth aspects.

Preferably, the method further comprises the step of selecting preferred assistance data available within the cluster for a clustered position determining unit.

Preferably, the method further comprises the step of comparing the localised assistance data developed by a clustered position determining unit with the cluster assistance data, to determine if the cluster assistance data may be enhanced and to cause the modification of the cluster assistance data responsive the developed localised assistance data.

Preferably, the method further comprises the step of operating a position determining unit to assume a special role in the cluster to arbitrate changes to the cluster assistance data.

Preferably, the method further comprises the step of the position determining unit operated in the special role communicating assistance data with an assistance server.

Preferably, the method further comprises the step of operating the position determining unit as a repository for local geospatially relevant data.

According to a twelfth aspect of the present invention, there is provided a computer program product containing one or more sequences of machine-readable instructions for processing assistance data at a relaying position determining unit, the instructions being adapted to cause one or more processors to perform the method according to the third aspect.

According to a thirteenth aspect of the present invention, there is provided a computer program product containing one or more sequences of machine-readable instructions for exchanging assistance data, the instructions being adapted to cause one or more processors to perform the method according to any of the fourth aspect.

According to a fourteenth aspect of the present invention, there is provided a computer program product containing one or more sequences of machine-readable instructions for receiving assistance data at an assisted position determining unit, the instructions being adapted to cause one or more processors to perform the method according to the ninth aspect.

According to a fifteenth aspect of the present invention, there is provided a computer program product containing one or more sequences of machine-readable instructions for providing assistance data from a transmitting position determining unit, the instructions being adapted to cause one or more processors to perform the method according to the tenth aspect.

According to a sixteenth aspect of the present invention, there is provided a computer program product containing one or more sequences of machine-readable instructions for exchanging assistance data, the instructions being adapted to cause one or more processors to perform the method according to the eleventh aspect.

According to a seventeenth aspect of the present invention, there is provided a GNSS assistance data receiving module for an assisted GNSS receiver unit wherein the GNSS assistance data receiving module is operable to obtain localised GNSS assistance data from an assisting peer GNSS receiver unit via an assistance server.

Preferably, the localised GNSS assistance data comprises data derived from measurements by the assisting peer GNSS receiver unit in a locality of the assisted GNSS receiver unit.

Preferably, the localised GNSS assistance data comprises data derived from an SBAS satellite.

According to a eighteenth aspect of the present invention there is provided a GNSS assistance data transmitting module for a GNSS receiver unit wherein the GNSS assistance data transmitting module is operable to develop localised GNSS assistance data and to transmit the localised GNSS assistance data to an assisted peer GNSS receiver unit via an assistance server.

Preferably, the localised GNSS assistance data comprises data derived from measurements performed by the GNSS receiver unit.

Preferably, the localised GNSS assistance data further comprises data derived from an SBAS satellite.

Preferably, the localised GNSS assistance data comprises geospatial data.

Preferably, the localised GNSS assistance data comprises raw data.

Preferably, the localised GNSS assistance data comprises packaged data.

According to a nineteenth aspect of the present invention there is provided a GNSS receiver unit comprising the GNSS assistance data receiving module of the seventeenth aspect and the GNSS assistance data transmitting module of the eighteenth aspect.

Preferably, the GNSS receiver unit is a GNSS roving receiver.

Preferably, the GNSS receiver unit is a personal mobile device.

Preferably, the GNSS receiver unit is operable to form a cluster with one or more peer GNSS receiver units in which the clustered GNSS receiver units exchange cluster assistance data with each other.

Preferably, the GNSS receiver unit is operable to select preferred assistance data available within the cluster.

Preferably, the GNSS receiver unit is operable to compare the localised GNSS assistance data it has developed with the cluster assistance data, to determine if the cluster assistance data may be enhanced and to cause the modification of the cluster assistance data responsive the localised GNSS assistance data it has developed.

Preferably, the GNSS receiver unit is further operable to assume a special role in the cluster to arbitrate changes to the cluster assistance data.

Preferably, in the special role, the GNSS receiver unit communicates assistance data with an assistance server.

Preferably, the GNSS receiver unit is further operable to act as a repository for local geospatially relevant data.

According to a twentieth aspect of the present invention, there is provided a method of receiving GNSS assistance data at an assisted GNSS receiver unit comprising the step of obtaining localised GNSS assistance data from an assisting peer GNSS receiver unit via an assistance server.

Preferably, the localised GNSS assistance data comprises data derived from measurements by the assisting peer GNSS receiver unit in a locality of the assisted GNSS receiver unit.

Preferably, the localised GNSS assistance data further comprises data derived from a fixed GNSS reference station.

According to a twenty first aspect of the present invention there is provided a method of providing GNSS assistance data from a transmitting GNSS receiver unit, the method comprising the steps of developing localised GNSS assistance data and transmitting the localised GNSS assistance data from the transmitting GNSS receiver unit to an assisted peer GNSS receiver unit via an assistance server.

Preferably, the localised GNSS assistance data comprises data derived from measurements performed by the transmitting GNSS receiver unit.

Preferably, the localised GNSS assistance data further comprises data derived from a fixed GNSS reference station.

Preferably, the localised GNSS assistance data comprises geospatial data.

Preferably, the localised GNSS assistance data comprises raw data.

Preferably, the localised GNSS assistance data comprises packaged data.

According to a twenty second aspect of the present invention there is provided a method of exchanging GNSS assistance data comprising the steps of forming a cluster of a plurality of peer GNSS receiver units and exchanging cluster assistance data between the clustered GNSS receiver units in accordance with the methods of the twentieth and twenty first aspects.

Preferably, the method further comprises the step of selecting preferred assistance data available within the cluster for a clustered GNSS receiver unit.

Preferably, the method further comprises the step of comparing the localised GNSS assistance data developed by a clustered GNSS receiver unit with the cluster assistance data, to determine if the cluster assistance data may be enhanced and to cause the modification of the cluster assistance data responsive the developed localised GNSS assistance data.

Preferably, the method further comprises the step of operating a GNSS receiver unit to assume a special role in the cluster to arbitrate changes to the cluster assistance data.

Preferably, the method further comprises the step of the GNSS receiver unit operated in the special role communicating assistance data with an assistance server.

Preferably, the method further comprises the step of the GNSS receiver acting as a repository for local geospatially relevant data.

BRIEF DESCRIPTION OF THE FIGURES

The present invention will now be described by way of example only, with reference to the accompanying figures in which.

DETAILED DESCRIPTION

Embodiments of aspects of the present invention relate to methods of generating and providing user derived assistance data which when provided to a device's positioning, timing and navigation solution(s), will improve, enable or speed up the process of a device obtaining appropriate position, time and navigation information and/or provide enhanced functionality to the user based on the availability of the assistance data. The invention can be implemented in a variety of ways but one arrangement focuses on a novel software client embedded in a variety of devices connected together into various network configurations.

By way of example only, the GNSS system referred to herein is mainly the United States' Global Positioning System (GPS) and SBAS such as WAAS, EGNOS etc. However the present invention should be understood to be valid and applicable to receivers that use other current and future GNSS such as GLONASS (GLObal'naya NAvigatsionnaya Sputnikovaya Sistema) and Galileo.

An arrangement of the present invention solves one or more of the shortcomings of existing methods of providing assistance data for devices that require position information and in particular, the limitations of current AGPS techniques as described earlier.

In this specification, assistance data is used to refer to both "GPS Assistance Data" and "Other Assistance Data", and these terms are defined below.

Software Client

Figure 1:
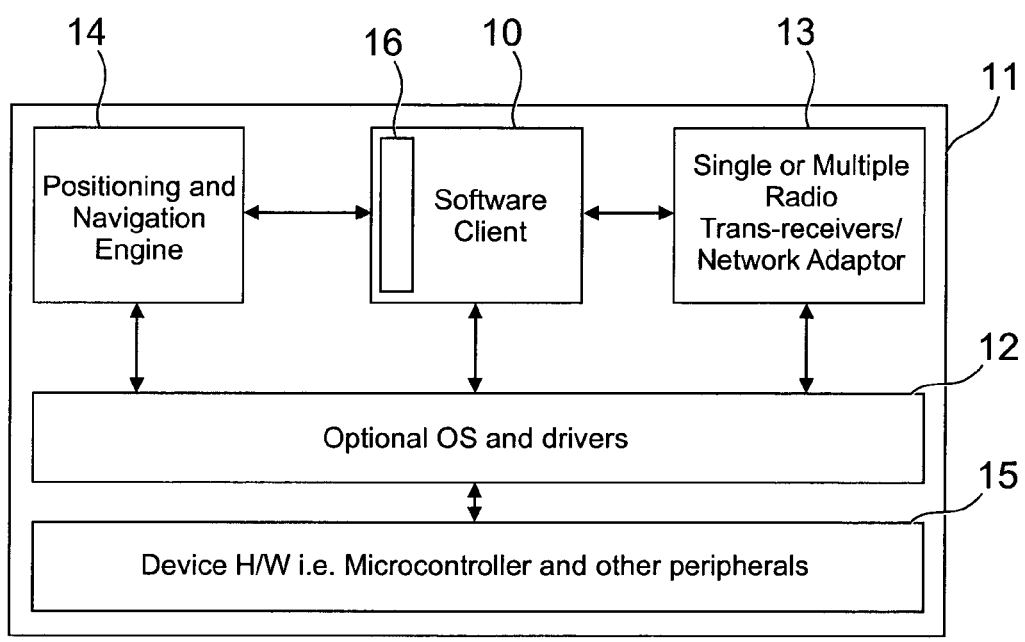
FIG. 1 illustrates in schematic form, the architecture of a position determining unit in accordance with the present invention.

With reference to FIG. 1, in one arrangement in accordance with the present invention, there is provided a software client 10 operating as an assistance data processing and relaying module on a position determining unit or device 11 running on any Operating Systems (OSs) 12, or embedded into a device, or a combination of both.

The device may also comprise a single or multiple trans-receivers system 13 to form a radio-link and/or a wired network system i.e. network adaptors etc. The combination thus forms any kind of possible wireless or wired networks such as Local Area Network (LAN), Metropolitan Area Network (MAN), Wide Area Network (WAN), Personal Area Network (PAN), Ad-hoc network etc. using any possible wireless standards/protocols such as but not limited to GSM/UMTS, Bluetooth, Wi-Fi, Wi-Max, UWB, ZigBee, TETRA, Infrared etc. and/or using any possible wired standard such as Ethernet, using any possible topology such as ring, bus, star, mesh or hybrid.

The device may also have a positioning and navigation engine 14 that uses GPS and/or any other positioning and navigation technologies and/or hybrid technologies. The device 11 may also have other hardware 15, e.g. microcontroller and other peripherals.

The software client 10, resident on each device in the network, is in addition to using generic algorithms able to make use of some combination of three different special functions depending on the availability of other components/units in the device and hence can perform different roles in the formed networks. Peer devices with the software client resident can be implemented on a wide diversity of inter-communicating device platform types.

In Function 1, Network Acquired Position and Assistance Relay, the software client 10 doesn't require access to the local device's positioning and navigation engine 14 so that such an engine does not have to be present in the device 11. In this function the software client 10 uses the device as a gateway or bridge in the network to relay assistance data between another two network nodes. The software client 10 can also directly access the assistance data in transit through the network and determine its own positioning, timing and navigation information depending on the content of the assistance data but independently of any local positioning engine. For example, the GPS assistance data can include time and positioning information of the device that is supplying the assistance data. The software client 10 can use this information to derive a coarse time and position estimation in the knowledge that it is in the same network and hence within a known number of short range communication steps of the other device. In this case, the accuracy will depend on the scale of the network and the transceiver protocol being used in the device.

In Function 2, GPS Acquired Positioning and GPS Assistance Generation, the software client has direct (embedded) or indirect access (through APIs) to the local GPS positioning and navigation engine. With this Function, performed by an assistance data generating module 16, the software client can generate GPS assistance data and provide them to the networks. It allows the local device to acquire location information based on a mix of local data acquired from the local positioning and navigation engine, data from Function 3, and network supplied data from Function 1, all dependent on which are active.

In Function 3, Other Acquired Positioning, the software client has direct (embedded) or indirect access (through APIs) to any other positioning, timing and navigation solution excluding GNSS, through the means of a separate positioning and navigation engine (not shown) that is present in the local device. With this function of the software client, Other Assistance Data can be generated and provided to the networks. Function 3 also allows the local device to derive location information based on a mix of local, and network supplied data from Function 1 and local information from Function 2 when these are active.

This software client is able to operate one or more of these three functions simultaneously. The capability to operate in Function 1 may be always enabled in the client (though not necessarily always active), Functions 2 and 3 may be enabled if appropriate to the positioning capabilities of the local device. The client may contain a means of detecting which location engines are present in any particular device, to determine the best combination of Functions to use.

There follows a more detailed description of the functions of operation.

Independent of which functions are in use the software client has the following basic functionalities.

The software client is able to communicate and control any or all of radio trans-receivers and/or network adaptors 13 either directly (i.e. embedded) and/or indirectly (i.e. through any OS). This software client may have means of sending and receiving assistance data request to and from another network participant; means of identifying requested assistance data (i.e. GPS Assistance Data, Other Assistance Data or both); means of sending and receiving assistance data to and from another participant in available single or multiple networks; means of packaging and encrypting assistance data and means of unpackaging and decrypting assistance data.

Additionally, the software client has functionalities, which are dependant on the particular Functions that are active, as follows.

For Function 2 and 3, the software client is able to communicate and control the positioning and navigation engine either directly (i.e. embedded) and/or indirectly (i.e. through any OS). The software client may have means of sending and receiving an assistance data request to and from the local positioning and navigation engine; means of identifying requested assistance data (i.e. GPS, other or both); means of providing assistance data to the positioning and navigation engine.

In Function 2, the software client has means of generating GPS assistance data with the help of the GPS solution in the local device positioning and navigation engine.

In Function 3, the software client has means of generating other assistance data with the help of other available, non-GPS, positioning, timing and navigation technologies.

Typically, the device is a handheld or portable mobile device but it could also be stationary/fixed.

Server

In another arrangement in accordance with aspects of the present invention, there is provided a server that may include means of participating as one of the nodes of any possible network formed with single or multiple devices which each have present the software client as mentioned in the first arrangement; means of sending and receiving assistance requests to and from the network participant and other resources connected to it; means of identifying requested assistance data (i.e. GPS, other or both); means of sending and receiving assistance data, for example GPS assistance data, to and from the network from the devices mentioned in the first arrangement; means of selecting/filtering suitable assistance data in case of similar data reception from a multiplicity of devices; means of processing and storing the assistance data in to the server database; means of determining initial position of devices connected in to the network; means of providing and/or enabling LBS with the help of assistance data; means of packaging and encrypting assistance data and means of unpackaging and decrypting assistance data.

Typically, the server is a web server in a Wide Area Network (WAN) configuration.

Alternatively, the server could be any server depending on the size of network coverage such as LAN server, MAN, PAN server etc.

According to another arrangement in accordance with the present invention there is provided a communication system comprising of one or more devices with a software client mentioned in the first arrangement, a server as mentioned in the second arrangement and any possible single or multiple wireless or wired networks where one or more devices are connected with or without the server through any available standards such as GSM/UMTS, Bluetooth, Wi-Fi, Wi-Max, UWB, ZigBee, TETRA, Infrared etc. in case of wireless and such as Ethernet etc. in case of wired, using any possible topology such as ring, bus, star, mesh or hybrid. Here, any possible networks could be Local Area Network (LAN), Metropolitan Area Network (MAN), Wide Area Network (WAN), Ad-hoc Wireless network etc. Preferably, these networks are wireless networks. Alternatively, these networks can also be wired or combination of both wireless and wired.

Assistance Data

Embodiments of the present invention relate to generating, relaying and receiving assistance data in different short range wired and wireless networks such as peer-to-peer and ad-hoc networks and also in Wide range wireless networks involving a Central Server.

Exchange of assistance data in the above-mentioned networks will enable and/or improve the networks' nodes positioning, timing and navigation capabilities individually and as a whole especially in harsh environments.

In an embodiment of the present invention, the Assistance Data are a combination of 'GPS Assistance Data' and/or 'Other Assistance Data'.

The "GPS Assistance Data" are data that primarily allow the in-built GNSS navigation technology/unit to enhance a device's position, accuracy and reliability, provide speed up of the positioning process and enable the positioning or any of the aforementioned in combination. The standard GPS assistance data may comprise raw measurements, pseudo-ranges, position and velocity estimates together with their quality indexes (i.e. standard deviations, various DOPs etc.), satellite specific ephemeris, almanac, navigation messages and parameters, Doppler estimations, code phase offsets (if time synchronised), atmospheric corrections, integrity indexes, quality indexes etc. Together, standard GPS Assistance Data may also include precise time information and estimated user receiver position. The quality of the GPS Assistance Data depends on the quality and technical capability of the generating device's GNSS solution in the positioning and navigation engine. Such data can be generated by the software client from the positioning and navigation engine using the GPS solution. Other GPS assistance data can be generated by decoding navigation messages from various GNSS (GPS, SBAS etc.) satellites, and some can be generated by applying various positioning and navigation algorithms on received signals from satellites. The assistance data may comprise one or more of SBAS data, data derived from a fixed reference station, geospatial data, raw data and packaged data. Once GPS Assistance Data is generated by any one device, it can be transmitted and used by another device as described herein.

The "Other Assistance Data" can be any data which can primarily help other existing positioning, timing and/or navigation technologies/units other than GNSS to improve, enable or speed up their performance and local derivation of position information or any combination of these conferred advantages. The capability of the in-built position and navigation engine of the device is therefore enhanced by the acquisition of information provided by other nodes within the network.

For example these data can be a database of local Wireless Access Points' position information relative to the assisted and/or assisting users which could be used in Wireless Positioning System (WPS) with protocols such as Wi-Fi, WiMAX or any relative existing or emerging wireless protocols along with signal strength measurements and algorithms like triangulations to get users' position estimates. These data may also include position and timing estimates of the device which can be generated from the mobile phone network based technologies, attitude information from Magnetic and INS sensors, altitude information from barometer etc.

Furthermore, all the nodes in the network can also combine their individual information to generate a unique solution to derive positioning and timing information applicable to all the nodes in the network. In an embodiment of the present invention, this "Other" positioning, timing and navigation technology/unit may be Wireless Positioning System (WPS) with either WiFi and/or WiMAX protocols and the "other assistance data" may be the data which can be accessed from the WiFi/WiMAX hardware from a mobile device in the area surrounding a wireless network, such as signal strength measurements, Access Point's Mac Addresses, Quality of Signals, Signal to Noise Ratios, SSIDs, Scanning Time, Encryptions, Type of APs, Modem Speed etc. and if available, the device's position coordinates. The position coordinates may be derived from the device's positioning, timing and navigation technology/unit such as Mobile Phone tower based triangulation, Inertial Navigation System, Manual User input etc. excluding GNSS. Further types of technology and data may be Signal Strength measurements and Cell Ids of mobile phone towers, measurements from different sensors of a mobile device such as Magnetic, INS, accelerometers, etc.

Some assistance data may be common in both GPS Assistance Data and Other Assistance data such as device's estimated position, UTC or local time information etc. Usually these data are positioning and navigation system independent, device specific, geographic, universal or any of these combinations.

Both the GPS Assistance data and Other Assistance data types of assistance data may be combined to form a common information pool or database containing all or any combination of both systems' assistance data. This information pool can have assistance data of a single device at any time or over a period of time or can have a collection of assistance data of multiple devices of a network at any time or over a period of time. This information pool can reside on a single or multiple nodes of network including the Central Server.

If the combined information pool is shared among the users in local networks, then the requirement of an internet connection for a device to get WPS based co-ordinates (which is a common practice) is overcome. The combined information pool can also be used to model the surrounding area around the nodes of a network such as nodes' location inside or outside the building or geographic location of nodes, etc.

Both the GPS Assistance data and Other Assistance data types of assistance data are also complement to each other. The device's WPS derived positioning co-ordinates and timing can be used with remaining GPS Assistance data to improve GPS performance in harsh environments and GPS derived co-ordinates can be used together with WPS Access Points' (APs) MAC addresses and remaining WPS data to create an information pool useful for WPS based positioning.

The GPS system used in the positioning and navigation engine could be single or multi-signal, complete hardware or complete software or a hybrid solution. It is also a possibility that all or any of the three components of the device: radio trans-receivers, position and navigation engine and software client can be a separate entity in any form i.e. hybrid, hardware or software or combined in a single chip or multi-chip system on chip solution.

Sending and receiving assistance data in the networks is done according to the requirements of user, device or networks, availability of single or multiple networks and/or devices and/or configuration and algorithms' requirements of the software client.

Thus the present invention may not only be limited to GNSS and its assistance data but can be applied both to other current and future GNSS positioning systems such as Galileo, GLONASS, Compass etc. and to the augmentation of positioning data derived from alternative existing or emerging position and navigation technologies such as WPS, INS etc. INS systems need informed of their starting coordinates, and subsequently track their position from this starting point based on their heading at each instant of recording. Errors are accumulated and on any event which resets the system, any knowledge of absolute position is lost. By joining into a network, the device can reacquire knowledge of its local absolute position within some approximation, and then continue to accurately track from that known position.

In the specification, the words device, user or receiver may represent the functionality of all or any of the components i.e. software client, positioning and navigation engine, GPS solution and wireless/wired communication network of the device described in the first arrangement.

It would be also appreciated that the software client and its functionalities can also be realised in hardware, in hybrid solution or in any logical way.

Examples of Assistance Data Exchange

The following explains the assistance data generation and exchange in various networks. The techniques/algorithms are described in reference to "GPS Assistance Data" generation and provision but as already stated, these techniques/algorithms can also be used generically for "Other Assistance Data". The same applies to the combination of both GPS Assistance Data and Other Assistance Data. In the specification, the term "assistance data" is used and should be understood to mean GPS Assistance Data in the specific GPS examples given, but is capable of being generalised to other non-GPS positioning and navigation solutions.

In the server based user network assistance technology, one or more devices with software client mentioned above are connected to the server using any possible network such as Local Area Network (LAN), Metropolitan Area Network (MAN), Wide Area Network (WAN) etc. This network could be any wireless or any wired network using any protocol such as GSM/UMTS, Bluetooth, Wi-Fi, Wi-Max, UWB, ZigBee, TETRA, Infrared etc for wireless and Ethernet etc. for wired networks. In this example, the server used is a World Wide Web Server. A plurality of devices with software client described above and this web server have formed WAN using mobile phone network.

Figure 5:
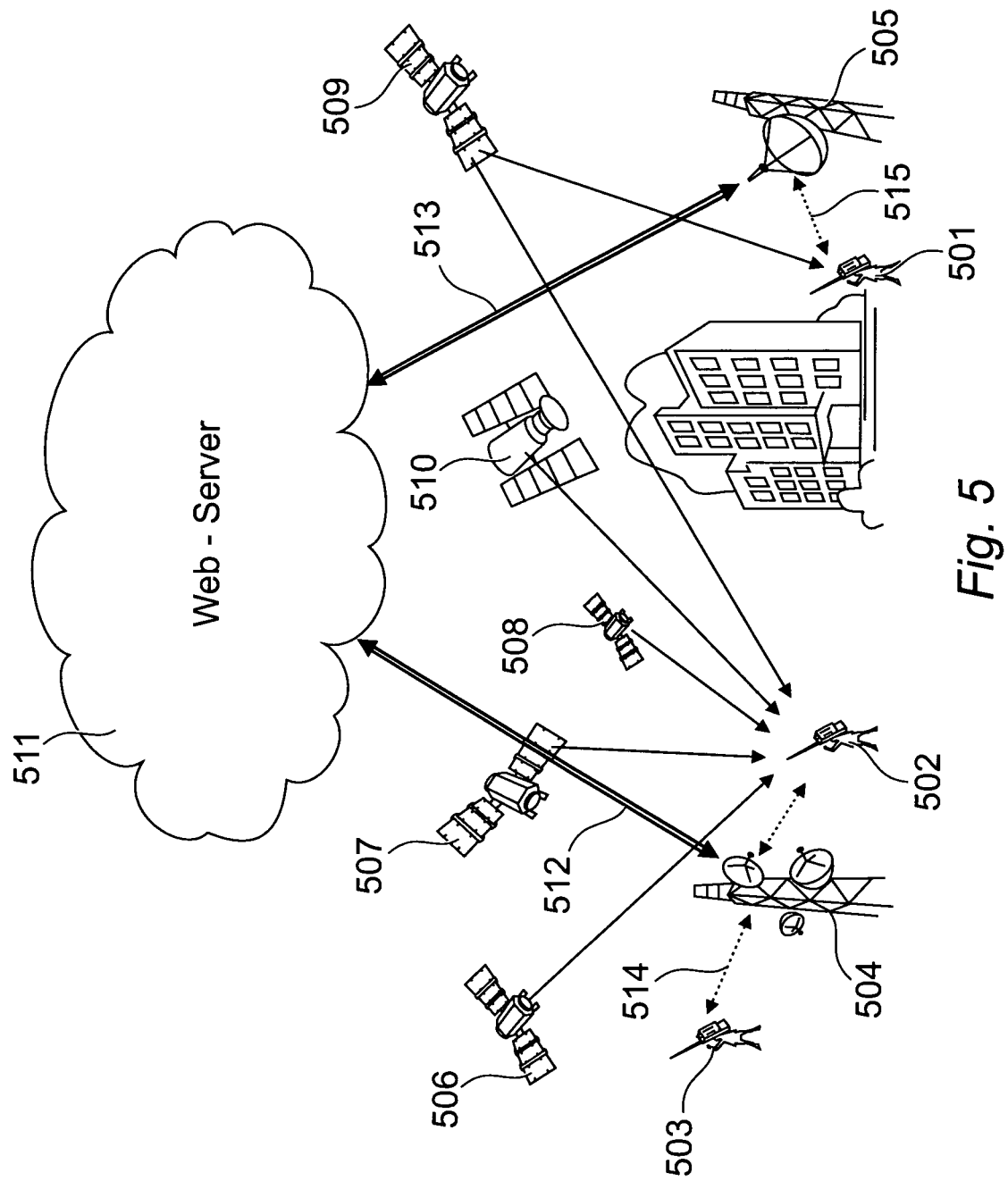
FIG. 5 illustrates, in schematic form, the functionality and data exchange between two users in accordance with the present invention.

In FIG. 5 devices 502 and 503 have clear visibility of sky and have been tracking satellites for enough time to generate assistance data mentioned earlier together with various indexes.

The assistance data is sent to the web server. These data can be sent to a server upon any of: server request; availability of data in the software client; configuration of software client; periodically or upon availability of the network; or any of these criteria in some combination.

Figure 6:
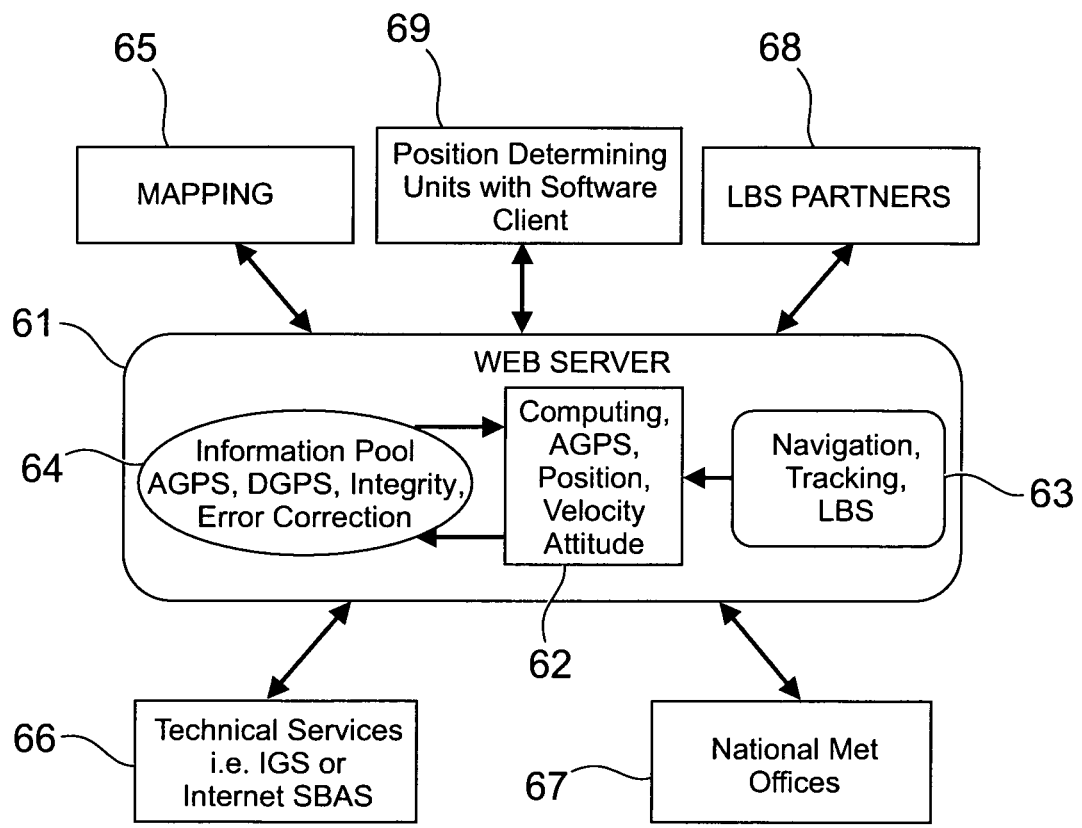
FIG. 6 illustrates, in schematic form a web server in accordance with the present invention.

The assistance data can also be sent to the server by other resources such as IGS, JPL, Internet SBAS services etc. as shown in FIG. 6.

The server checks various quality indexes of assistance data described earlier together with various client flags to identify correct/suitable data in case of receiving similar assistance data from multiple devices and/or other resources. These data are filtered, processed, can be mapped characteristically i.e. geographically, user specific, satellite specific, general etc. and stored in the server database.

In the present example, device 501 is in low signal to noise environment with poor visibility of sky and hence not able to acquire the required satellites to fix its position.

The assistance process after formation of network can be summarised in the following steps.

1 Software client in the device 501 in a low signal to noise environment sends an assistance request signal to the assistance (web) server.
2 The assistance server roughly estimates the requesting user's position, for example through mobile positioning technique (Cell ID) or hotspot identification.
3 The assistance server uses the estimated position to retrieve suitable assistance data from its storage and transmits it back to the requesting device.
4 With the help of the assistance data, the device's positioning and navigation unit acquires and tracks satellites.
5 Device form observations by using assistance data message, applying error corrections and derives positioning and navigational solutions.

Devices 501, 502 and 503 are separated by few kilometers distance and none of them are within the range of short range trans-receiving distance of each other. But they are all in the range of either tower 504 or 505 which are either towers for mobile networks or Wi-Fi hot spots. These towers provide all the devices with internet capability via links 514, 512 and 515, 513 respectively. Hence devices 501, 502 and 503 are connected to a pre-specified common web server, 511 through towers either 504 or 505.

Devices 502 and 503 are transmitting assistance data back to the server while receiver 501 is having difficulty in getting a lock on the satellites due to lack of direct line of sight to the satellites because of tall surrounding buildings. In this case device 501 has a connection with the common web server through tower 505 which doesn't have to be in direct line of sight. Device 501 sends a request for assistance to the web server and the web server locates its rough position through mobile positioning techniques or Wi-Fi spot identification. Having established the rough location of the requesting device, it derives the necessary relevant information from the information database in order to compose an assistance message. This message is transmitted back to the device 501 and enables it to obtain lock on the satellites to derive its GPS position. The information transmitted back to the device is free from the spatial variations due to the greater distance that exists between the known AGPS reference station and the user. In the case of server based assistance, the temporal variations are kept within tighter limits, making for more accurate results.

FIG. 6 illustrates the assistance server and additional features to enhance the assistance and other LBS (Location Based Services). The web server 61 comprises mainly a computational power, state of the art positioning 62, navigation and error correction algorithms 63, filters and a large data base 64 where the derived assistance information is mapped with its geographical locations. As depicted in FIG. 5, all the receivers 501, 502 and 503 are connected to the web server and may transmit assistance data back to the server. These assistance data can be of any combination of messages described earlier depending on the device's positioning and navigation solution capabilities. All these data along with their geographical positions are stored in the information database 64. The positions of the device which inputs the assistance data can be input by the device itself or can be calculated by the server using the supplied raw data measurements and advanced filtering algorithms. The advantage with the latter is that it reduces the computational load of the device and can apply state of the art algorithms to enable and/or improve position. In addition to the above described assistance, the web server can be interfaced with extra features supporting mapping 65, SBAS corrections through internet 66, precise weather information 67 and other LBS services 68 to give users the best advantage of a user network. Precise weather information can be used to predict very accurate atmospheric error parameters leading to improved user positioning accuracy. Mapping and other LBS can be combined with user networks to give intelligent GNSS receiver cluster updates, for example for use with traffic updates in an automotive navigation solution.

Figure 7:
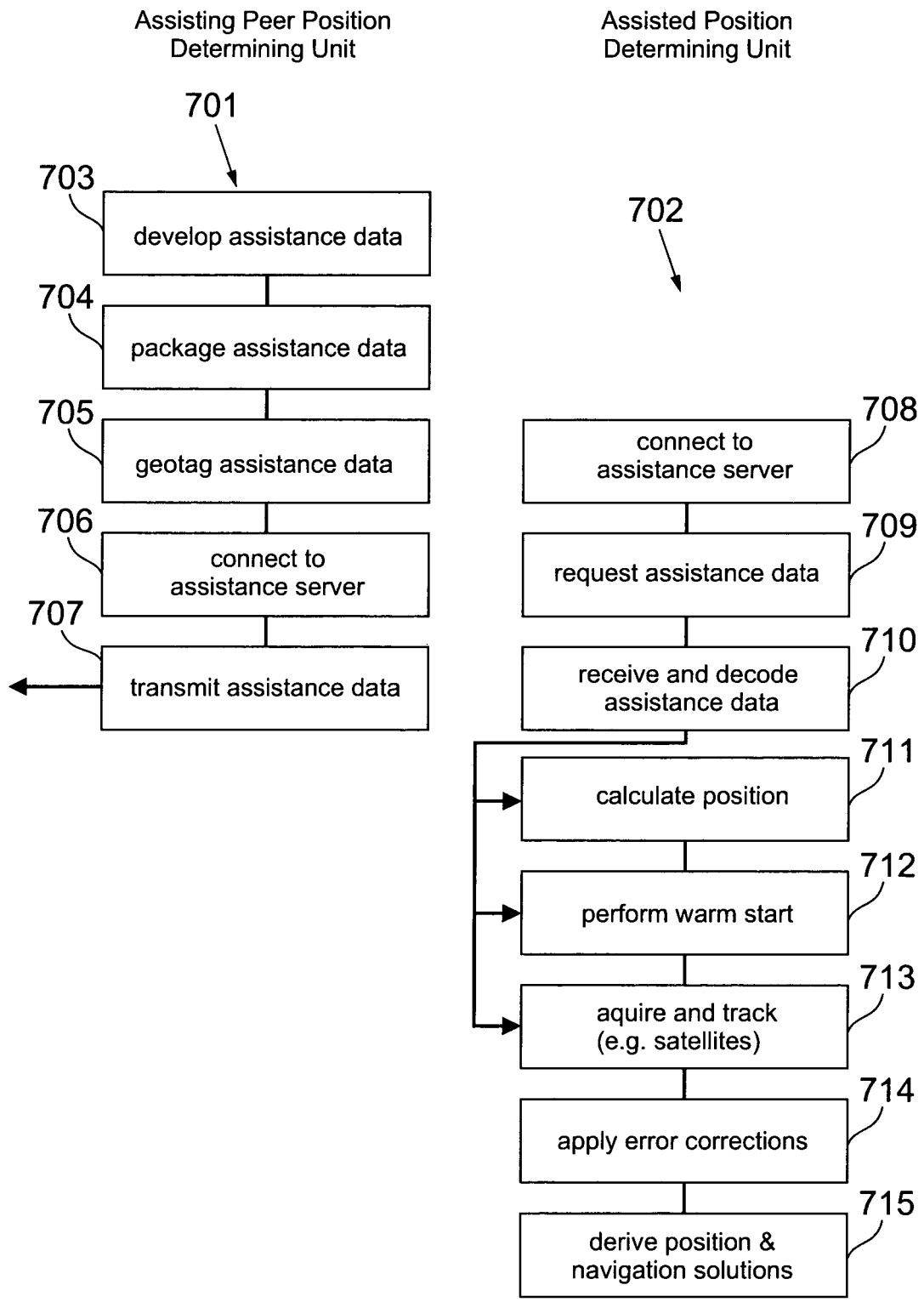
FIG. 7 is a flow chart of the operation involving a server in accordance with an embodiment of the present invention.

With reference to FIG. 7, a flow chart shows the operation of an assisting peer GPS device unit 701 and an assisted GPS device unit 702. The assisting peer GPS device unit generates assistance data 703. It then packages the assisted data 704 including the step of geo-tagging the assistance data 705. It then connects to the assistance server and transmits the assistance data to the server 707.

Meanwhile, the assisted GPS device unit has connected to the assistance server 708. It then requests assistance data 709 and receives and decodes 710 the assistance data.

The assisted GPS device unit then uses the assistance data for one or more of calculating its initial position 711, performing a warm start 712 and acquiring and tracking satellites 713. After acquiring and tracking satellites 713 the assisted GPS device unit may apply error corrections 714 and derived precise positions and navigations solutions 715.

In a cluster based assistance arrangement, one or more devices with software client mentioned above, a server mentioned above and any possible single or multiple wireless or wired networks where one or more devices are connected with or without the server through any available standards such as GSM/UMTS, Bluetooth, Wi-Fi, Wi-Max, UWB, Zig-Bee, TETRA, Infrared etc. in case of wireless and such as Ethernet in case of wired, using any possible topology such as ring, bus, star, mesh or hybrid. Here, any possible networks could be Local Area Network (LAN), Metropolitan Area Network (MAN), Wide Area Network (WAN), Ad-hoc Wireless network etc. Typically, these networks are wireless networks. Alternatively, these networks can also be wired or combination of both wireless and wired.

The network can be initiated by a participant i.e. by a server or by any of the network devices described in claim 1 based on assistance data requirements or data availability or software client configuration or any of the above combinations. The remainder of the devices and/or server participate in the network based on similar criteria mentioned above, and depending on their ability to join the network.

Assistance data can be generated either in one of the participating devices mentioned earlier or in the participating server described earlier. The assistance data can also be imported in to the current network from other networks if single or multiple devices and/or servers are sharing more than one network including the current network.

Figure 2:
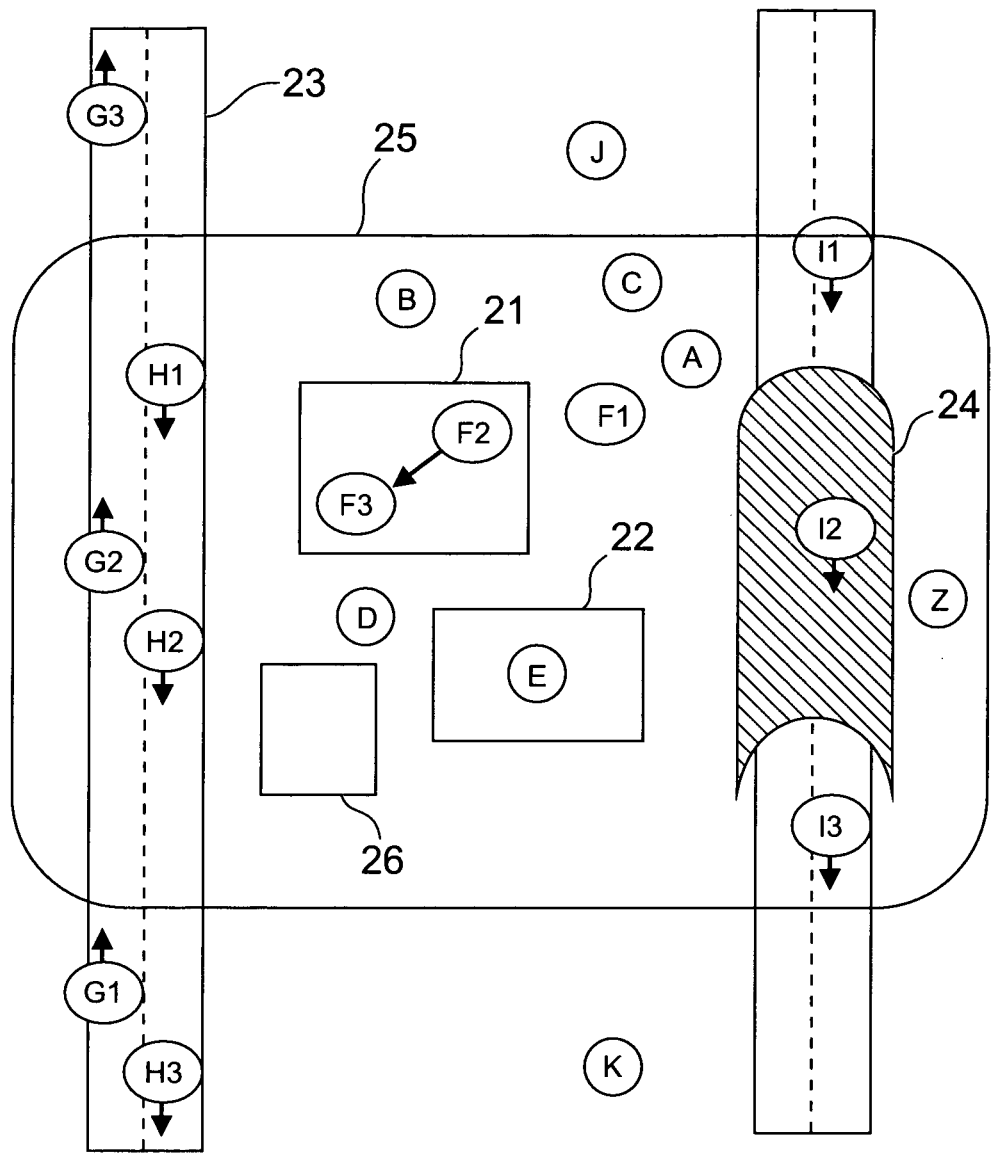
FIG. 2 illustrates, in schematic form, the formation of a receiver unit cluster in accordance with the present invention.

FIG. 2 illustrates the formation of the cluster by many devices described in the first arrangement above, and common problems currently faced by GPS users in urban environments, but the illustration is equally applicable to the variety of reception conditions in other geo-spatial environments.

FIG. 2 illustrates a variety of user types, and the many issues associated with devices using current GPS solutions in their positioning and location engine. Items 21, 22 and 26 are highly attenuating structures, e.g. buildings. Item 23 is a fast transit channel, such as a road or rail link, and Item 24 is a completely GPS signal blocking structure such as a tunnel. Devices A, B, C, G, H, J and K have good open sky visibility of at least four satellites. Devices A, B, J and K are locked to enough satellites to have a good fix, while device C is in the process of achieving fix. Device D is in an urban canyon, and with only partial lock on visible satellites. Device E is unable to achieve lock due to low signal/noise ratio. Device F has a good lock at time 1, but moves into an attenuating condition, losing lock at time 2, before moving to a new position within the building at time 3 (labelled F1, F2, F3 respectively). Device G traverses at high speed from position G1 (at time 1) to position G3 (at time 3). Device H traverses at lower speed from position H1 to position H3. Device I has a good position fix at time 1 in position I1 and about to enter the tunnel, at time 2 is inside the tunnel with no satellite signal in position I2, and at time 3 exits the tunnel at position I3. Z is a fixed reference, special device.

These different device conditions illustrate many of the current problems experienced by devices of GPS positioning and location engine. In particular, device C is using significant battery power in a cold start procedure, while various data on available satellites is collected, prior to being able to fix a position. Devices D and E are unable to fix a position because of difficulty in adequately tracking four satellites. Device F has a fix at time 1, but loses it as he moves into a building, and cannot maintain his position information as he changes course. Devices G and H move quickly through the geographic location with no AGPS particular to that location, unless they make a paid for access to a telecommunications provider. Device I has no functionality while inside the tunnel, and has to perform a warm start fix to reacquire satellites once he re-emerges from the tunnel.

Device D requiring assistance initiates any of the possible networks mentioned in network formation process. The remainder of the devices shown in the figure join this network, adhering to the agreed network formation process.

The devices exchange data relevant to that cluster with each other, either on an event driven or synchronised basis by the requirements of user, device or networks and/or configuration and the algorithmic requirements of the software client. This data as a minimum includes GPS Assistance Data as described earlier, but may also include other geo spatial data relevant to the present physical location of the cluster. The devices also have the optional ability to supply data which provides information on their own characteristics relative to the cluster. The quality of the assistance data in the cluster depends on the quality and technical capability of the peer GPS positioning and navigation engine in the cluster group. The device is capable of acquiring and interpreting the cluster data and able to adapt its functionality according to its current cluster data set, including without limitation, enhancing its ability to fix-on and track satellites, enhancing its predictive navigation ability, and its ability to provide enhanced output to the user.

The device has the capability to acquire new data, to compare this with cluster data, and compute whether the cluster data can be enhanced, prior to relaying this modified data to other members of the cluster, and or a fixed special device, and or a distant device over a longer range communication link.

After acquiring the assisted data from the cluster, the device is able to roughly calculate its position by using user specific position coordinates from the cluster data and also knowing the fact that it is within the short range radio link distance from the assisting device. The maximum position error in this case would be the maximum transmission range of the radio link being used. This position error is inversely proportional to the number of user specific coordinates used from the cluster data to estimate the position and depends on relative geometry of the vectors between the user receiver and other users in the cluster. This position estimate can also be enhanced if the distance between the user receiver and the assisting receivers in the cluster can be measured using radio link signal processing techniques and triangulation or any other methods.

A special device acts as a reference site within the cluster, and has special priority in arbitrating on changes to the cluster data set. The special device may also communicate and exchanges data with a central assistance server based at a distance from the cluster as described in the server based assistance method.

Referring again to FIG. 2, Item 25 shows the limit of an ad-hoc cluster which has been formed by a certain group of devices. Devices J and K lie external to this cluster and form another cluster within short link radio range of some of the clustered devices. Devices A and B at least have already established a cluster data set, which they transmit to all other users within the cluster.

The basic concept of forming a cluster (network) and data exchange between the two user receivers A and D is explained in detail with reference to FIG. 3.

Figure 3:
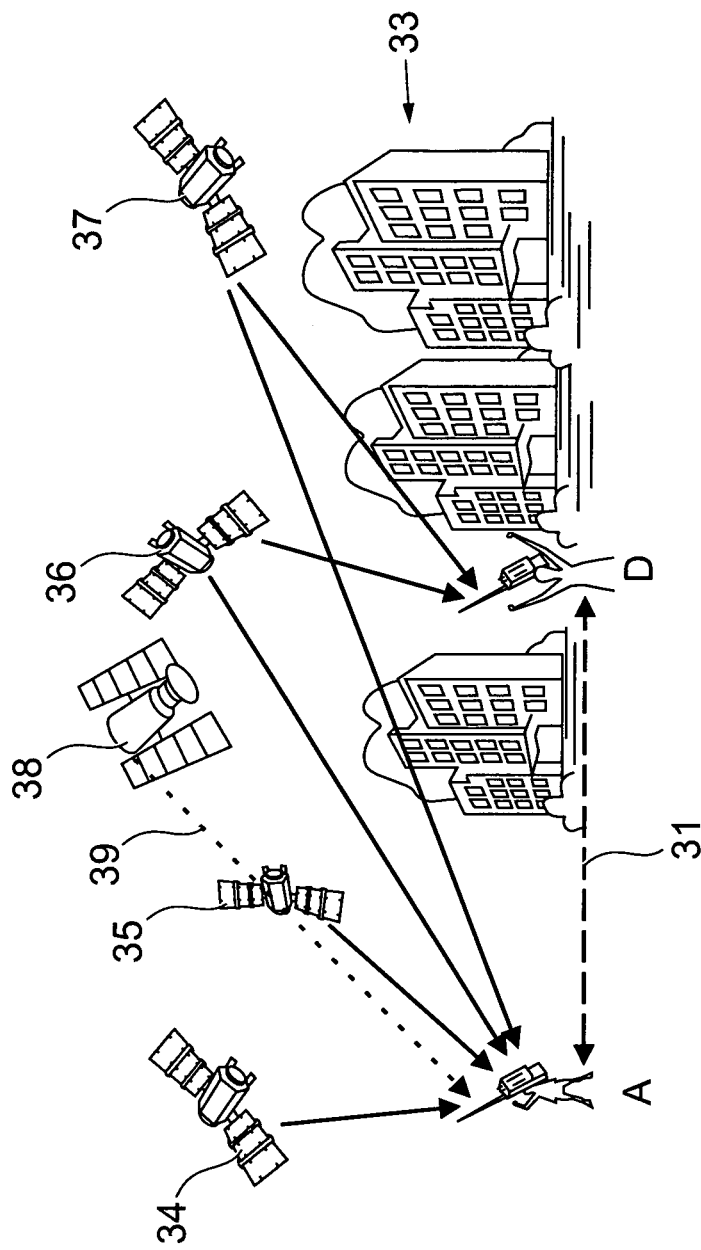
FIG. 3 illustrates, in schematic form, the functionality and data exchange between two users in accordance with the present invention.

FIG. 3 illustrates the functionality and data exchange between two users in a cluster. Receiver A is able to receive signals from satellites 34, 35, 36 and 37 to calculate its positioning and navigation parameters. Satellite no. 38 is shown as an SBAS satellite which transmits the atmospheric, ephemeris and satellite clock error correction to improve the accuracy of the positioning of the receiver. However user receiver D is marginal in receiving all of the signals because of the tall buildings, 33 close to the receiver which is blocking direct line of sight from satellites 34,35 and 38. In this condition receiver D can not fix its position as it can not get locks on to satellites 34, 35 or to see SBAS satellite 38, and therefore only has a possibility of locking on two out of the minimum four satellites required to derive position.

As previously mentioned devices A and D have already made a cluster (505 in FIG. 2) and developed the assistance data relevant to the cluster. Unable to track the required satellites to get the position, device D looks for assistance in the cluster through any of the previously mentioned short range communication protocol and radio link (31) to get fixes on satellites 34, 35 and/or 38. Device D receives directly from device A all of the additionally required satellite or assisting device specific assistance information such as current ephemerides, precise time, estimates of Doppler frequency and phase offsets, navigation message, for all the visible satellites. With the help of this data device D manages to track all of the required satellites in low signal to noise environment and makes an estimate of position. The device D also receives error correction and integrity data 39 transmitted by SBAS satellites relayed through cluster data, further improving the precision of position. If device A has multi-frequency GNSS functionality then it can also provide very precise geo-location specific ionospheric correction data to the cluster.

With reference again to FIG. 2, device C is also able to obtain assistance data from the cluster to perform warm start. Assistance data provides device C with ephemerides of the visible satellites, estimated Doppler frequencies, initial estimation of the user position, time, satellite error corrections and other useful data. This significantly reduces time to first fix for device C and significantly reduces the computational power, and therefore the battery power that it would otherwise have to expend. In addition, depending on the quality of the assistance data (technical capability of the device A and B positioning and navigation engine) device C also receives locally relevant atmospheric corrections to improve position accuracy. Device E also obtains the required fixes using assistance data, especially the a priori navigation message bits, helping device E to apply specific DSP algorithms to increase signal to noise ratio of the highly attenuated indoor GNSS signals. Device F also manages to derive an appropriately updated indoor position using the assisted data received. Device I cannot lock on to any GNSS satellites because of the complete blockage of GNSS signal inside the tunnel, although it manages to receive assistance data through short range radio link and therefore manages to roughly locate itself by using the device specific position coordinates from the cluster data and also knowing the fact that it is within the short range radio link distance from the assisting device, as described above. Device G joins the cluster briefly at time 2, and rapidly updates its core cluster data set, improving precision in comparison to its current standalone navigation ability. Optionally it also acquires ancillary local information such as traffic updates, or other local geo-spatially relevant data.

Figure 4:
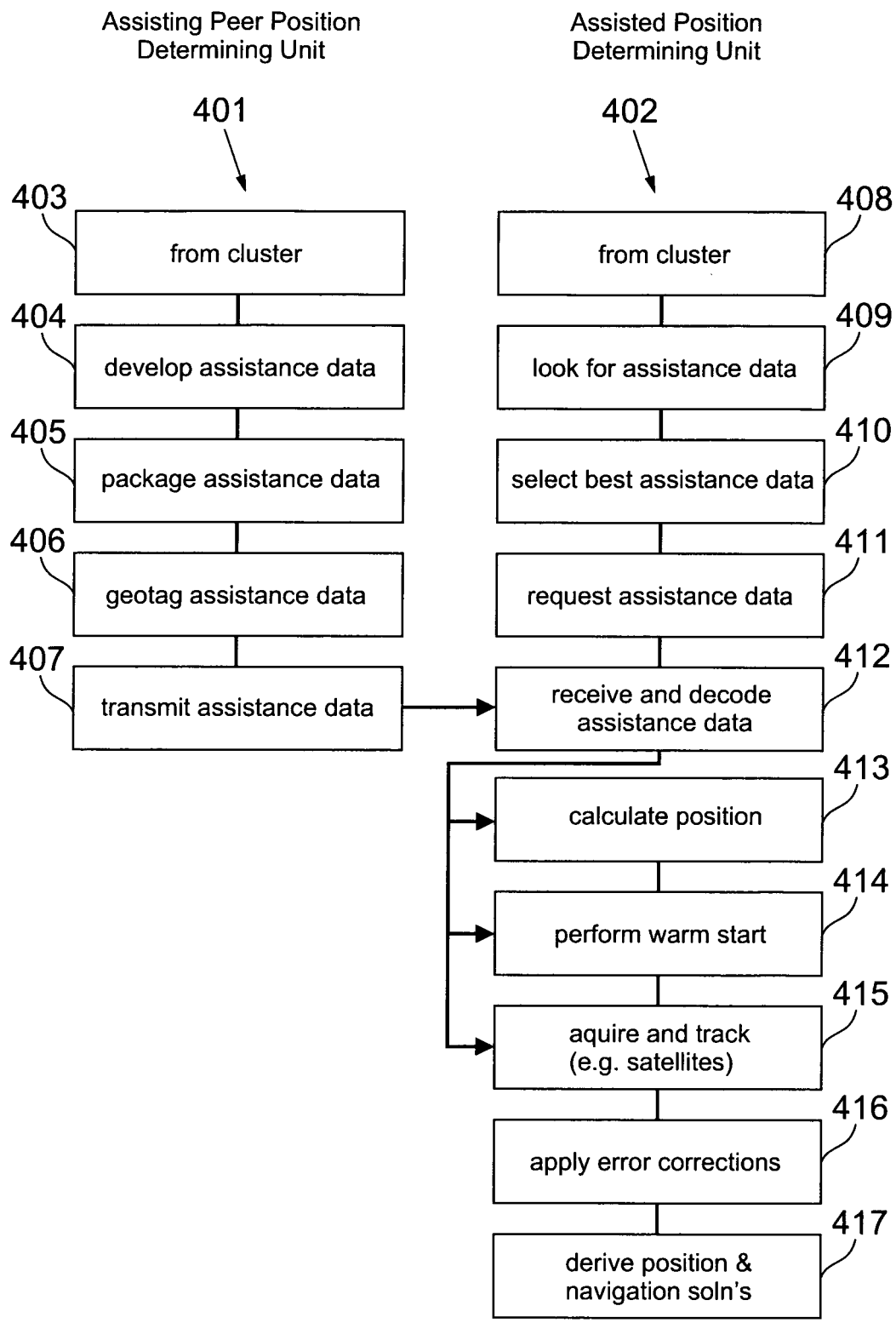
FIG. 4 illustrates a flow chart of the operation in a cluster in accordance with an embodiment of the present invention.

With reference to FIG. 4, a flow chart shows the operation of an assisting peer GPS device unit 401 and an assisted GPS device unit 402 in the cluster based approach.

The assisting peer GPS device unit forms a cluster 403 and develops assistance data 404. It then packages the assisted data 405, optionally including the step of geo-tagging the assistance data 406. It then transmits assistance data 407 to the cluster.

Meanwhile, the assisted GPS device unit has co-operated in forming the cluster 408 and has looked for assistance data 409 and selected the best assistance data 410. It then requests assistance data 411 and receives and decodes 412 the assistance data that has been sent by the assisting GPS device unit in step 407.

The assisted GPS device unit then uses the assistance data for one or more of calculating its coarse position 413, performing a warm start 414 and acquiring and tracking satellites 415. After acquiring and tracking satellites 415 the assisted GPS device unit may apply error corrections 416 and derive precise position and navigations solutions 417.

Peer to Peer Ad-Hoc Networks

Sometimes it is desirable and/or efficient and/or only possible to form peer to peer ad-hoc networks between devices. As with all the previous methods, this network is formed using any available wireless or wired protocol. Multiple peer to peer networks can be formed in an area using any network topology mentioned earlier.

Figure 8:
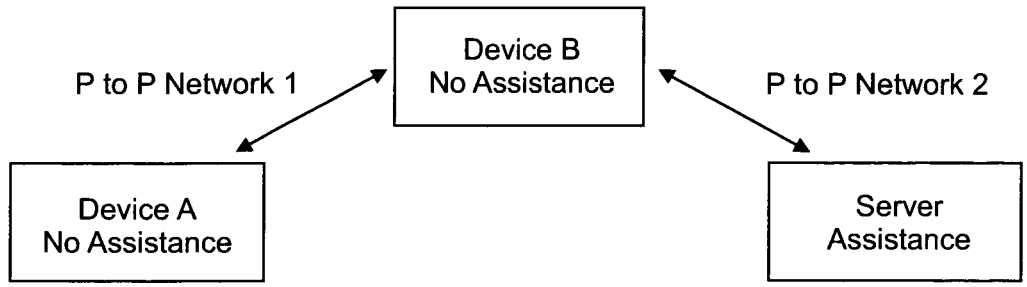
FIG. 8 illustrates importing assistance data from a server in another peer to peer network.
Figure 9:
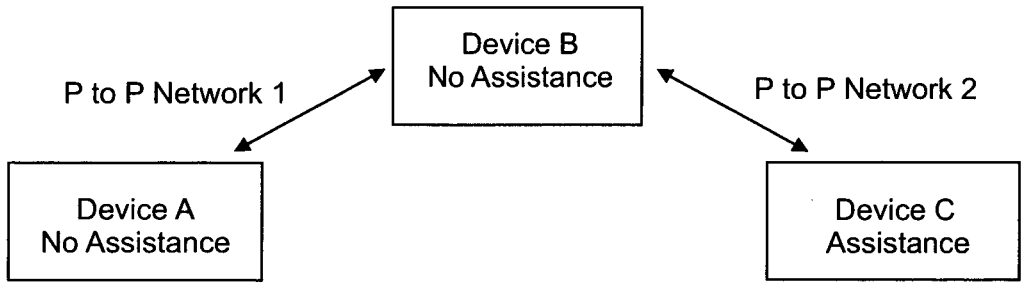
FIG. 9 illustrates importing assistance data from a device in another peer to peer network.

The assistance data can be generated locally in the device itself as mentioned earlier or it could be imported into the device if a node in one of the networks is a server, as shown in FIG. 8, or imported from another peer to peer network if the device is a member of multiple peer to peer networks, as shown in FIG. 9.

Figure 10:
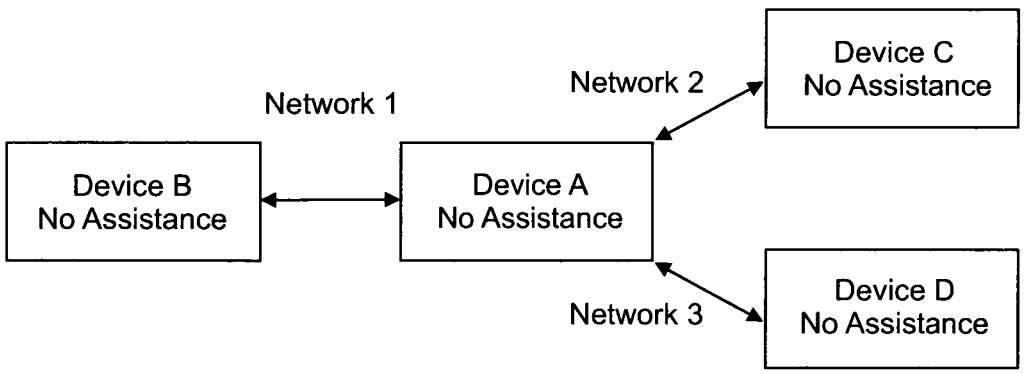
FIG. 10 illustrates requesting assistance data from several devices in an ad-hoc peer to peer network.

In FIGS. 8, 9 and 10 devices A, B, C and D are member nodes of one or more peer to peer ad-hoc networks not all of which are necessarily shown. Apart from the illustrated peer to peer ad-hoc networks then, each node can also be a part of other larger networks completely independently of each other device shown, or sharing these larger networks with one another. These larger networks can be any wired or wireless network using any protocol forming any possible topology either as described earlier or as otherwise known.

Various algorithms can be implemented in software client to enable peer to peer ad-hoc network assistance and three are described below.

1. Assistance on Request (AOR): Multi Node Single Hop

In FIG. 10, Device A has three ad-hoc networks. Network 1 is formed with Device B. Network 2 is formed with Device C. Network 3 is formed with Device C. All four devices are shown having no valid assistance data.

Figure 11:
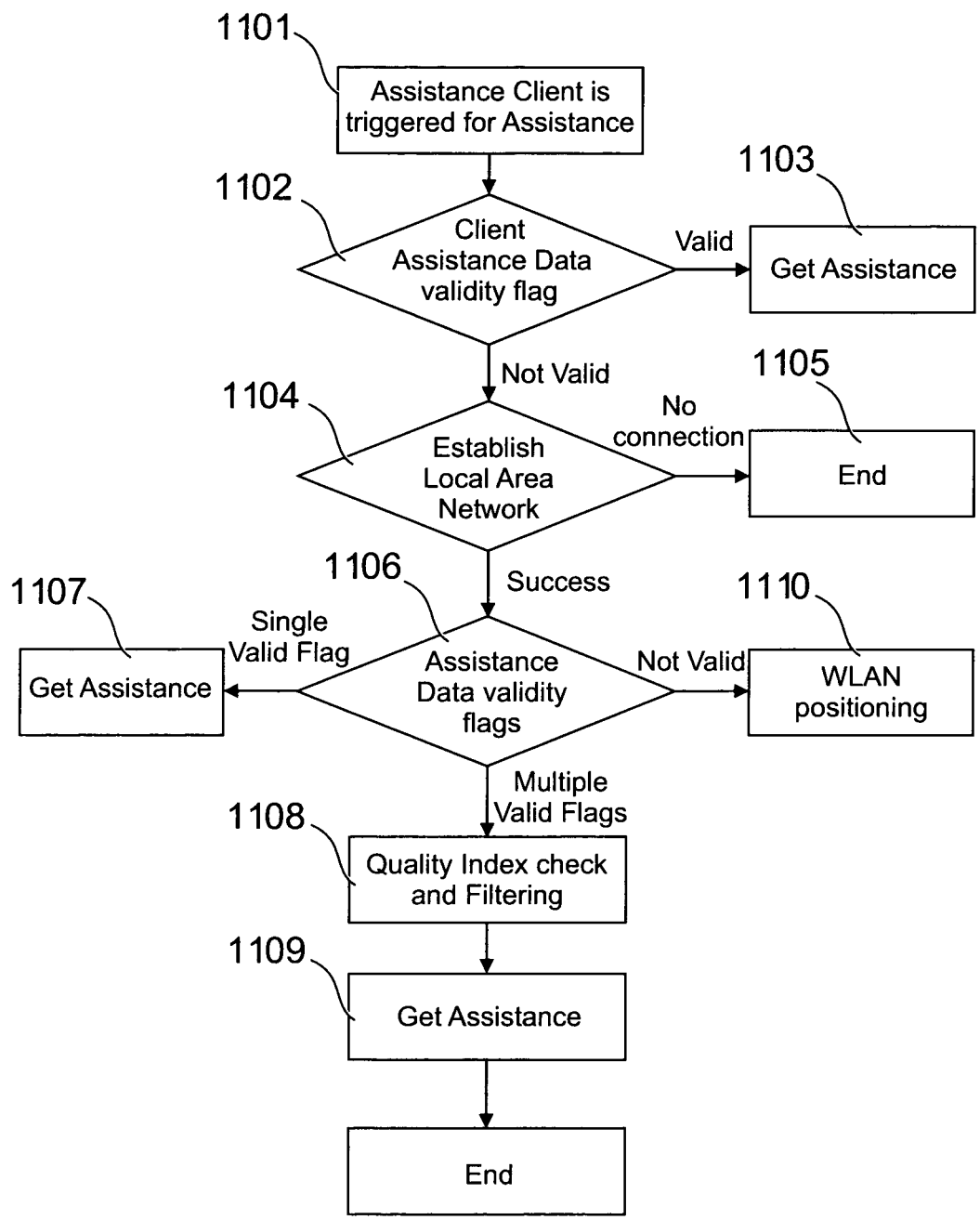
FIG. 11 is a flow chart of the operation of requesting assistance data from several devices in an ad-hoc peer to peer network.

As shown in FIG. 11 the client has received an assistance request from the internal positioning and location engine. Once triggered 1101, the client checks data validity flags 1102 to see whether internal assistance data are valid or not. If found to be valid 1103, these data are sent to the positioning and navigation engine. If found invalid, the client tries to establish 1104 any one of the possible networks discussed earlier. If no network connection is established, the client's process ends 1105, and the positioning and navigation engine is informed. If successful, the client checks peer devices' assistance data flags validity 1106. If one of the devices in the peer to peer networks is found to have valid assistance data, assistance data are received from it 1107 and are sent to the positioning and location engine. In case of multiple valid flags, the client runs various data quality index checks 1108 and filtering algorithms to ensure it receives 1109 the best assistance data available from the peer to peer networks formed. In the case that all of the flags are found invalid, other positioning algorithms can be implemented 1110 such as WLAN positioning etc. depending on the technical capabilities of the device.

2. Assistance on Request (AOR): Multi Node Multi Hop

Figure 12:
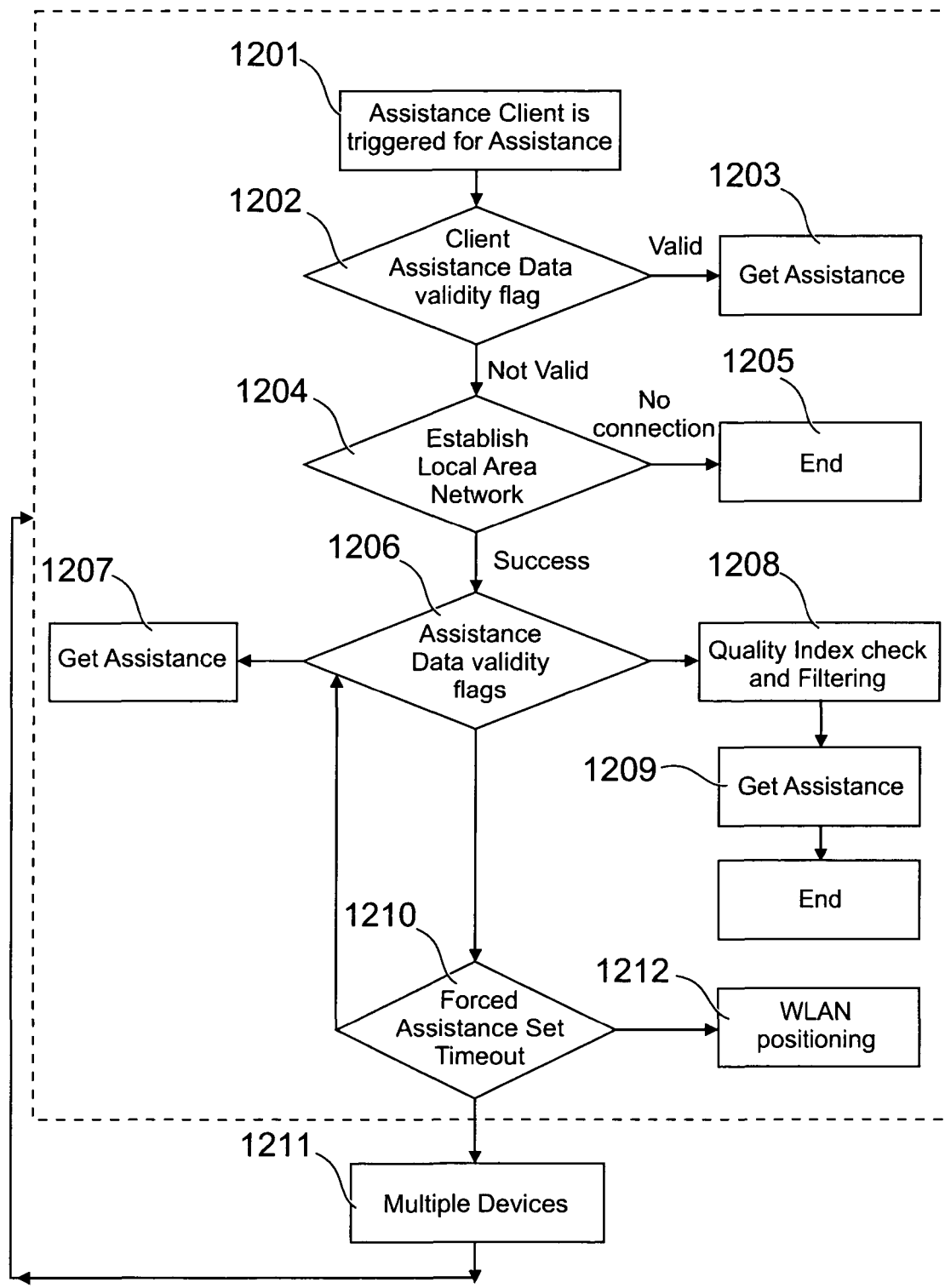
FIG. 12 is a flow chart of the operation requesting assistance data from several devices in an ad-hoc peer to peer network and causing establishment of other peer to peer networks.

This algorithm is very similar to the algorithm described above in relation to FIG. 11, and also refers to the networks shown in FIG. 9, but extends its functionality to other peer to peer networks. With reference to FIG. 12, this steps 1201 to 1209 correspond to steps 1101 to 1109 respectively as described in relation to FIG. 11. In this algorithm after establishing networks, if all the assistance data flags are found to be invalid, rather than doing WLAN positioning (1110 in FIG. 11), the assistance requesting client can force 1210 other peer device's clients to establish 1211 separate peer to peer networks to get assistance data within defined time limits. This forced assistance can induce the formation of as many hops as possible within the set time limit or network limitations and/or client configurability.

If even after using multi-hop algorithms, the client doesn't get the required assistance data, the client can use 1212 other positioning algorithms such as WLAN positioning depending on the technical capabilities of device.

3. Continuous/Periodic Assistance:

In Periodic Assistance, the assistance client is active as long as the device is on, but is in a low power/sleeping mode. This client can be configured to periodically get assistance or update internal assistance data either from the native GPS engine or by forming a local or wide area network. The periodic rate can be user configurable as well as assistance data validity period dependent. For example, satellites ephemeris are valid for 4 hours, so that the reacquisition rate can be set to every 4 hours.

This periodic assistance can also be set on the availability of local or wide area network connections and assistance provision. In this case, the client will get or update native assistance information as and when network connections are available. This is useful as the assistance client can provide reasonable assistance data according to circumstances, when both local and wide network connections are unavailable.

Both single hop and multi hop network assistance methods can be configured to get periodic/continuous assistance data via the assistance client.

The arrangements described herein relate to calculating a mobile or stationary user's position and navigation parameters from signals transmitted both by GPS satellite systems and peer users. More precisely, they relate to providing assisted data to GPS users in unfavourable environments to enable them to acquire and track signals which it is otherwise difficult to lock on to, in conditions where there is limited direct line of sight to the satellites and/or low signal strength and to provide an alternative means of providing location and navigation assisting information in the absence of satellite lock. Furthermore, these arrangements also enhance the known assistance techniques to provide better accuracy, better time to first fix, faster and up-to-date assistance data with lower implementation cost.

Thus the assisted data is formed by the peer users and either transmitted through short range communication link directly to the assistance requiring user or alternatively in to the server through GSM/UMTS or Wi-Fi and on to the assistance requiring user once again through GSM/UMTS or Wi-Fi. This arrangement eliminates the need for having a network of GPS reference stations across the globe. Because of the limited number of reference stations in the known AGPS networks, it is not possible to transmit spatially varying assisted data (data that varies with geography) to the user such as atmospheric corrections, code phase estimation etc. This drawback is overcome in the current arrangement due to a high density of peer users' GNSS units acting as reference stations.

Additionally, cluster based assistance removes the need of communication link to the server which saves a lot of time and cost in sending assisting data to and from the server. The reduced time delay advantage can be exploited for sending temporal assisting data (varying with time) to the users and in improving the user experience generally due to reduced response time. The arrangement as presented can also provide simplified exchange of localised geospatial data for extended functionality of location based services.

A particular arrangement according to the present invention, User Network Assisted GNSS, provides assistance data to peer GNSS user receivers in different forms so as to reduce time to first fix, to improve positioning accuracy, to be able to acquire and track the satellites in low signal to noise environments, to improve power consumption and to provide LBS data.

The User Network Assisted GNSS is further divided in to two arrangements depending on the distance of the peer users around the user receiver and the range of the wireless link, referred to herein as Local Area User Network Assisted GNSS (LAUNAG) and Wide Area User Network Assisted GNSS (WAUNAG) respectively.

In LAUNAG, a single or multiple GNSS receiver(s) in locations with poor visibility of the sky and hence no, or only limited access to the GNSS satellite constellations are either unable, or only marginally able to obtain a position and navigation fix. These marginal reception receivers however also have short range wireless trans-receiving capabilities, and can consequently receive data from one or more receivers of similar technical capability in the vicinity at the same time. If some of the additional receivers within the range of wireless coverage have a good view of the sky (i.e. satellite visibility) and are already tracking the satellites and have computed their own position and/or navigation fix, then the position fixed receivers can transmit assistance data directly to the marginal reception receivers helping them to derive their own position and or navigation fix.

The basic functionality of such a LAUNAG arrangement may be as follows:

1. GNSS receivers within a specific range form clusters. Receivers with good position fixes start putting data into the cluster.
2. Receivers in low signal to noise environments search for assisted data in the relevant cluster.
3. User GNSS receivers identify the best suitable assistance data from a multiplicity of instances of assistance data and decode the selected assistance data.
4. With the help of the assistance, the user GNSS receiver acquires and tracks satellites.
5. The user GNSS receiver uses the assistance data to apply error corrections and derive positioning and navigation solutions.

In WAUNAG, receivers with GSM/UMTS or Wi-Fi capabilities and internet coverage send their measurements and data to a common web server, including their position and navigation fixes, with associated accuracy indexes and other assisted data. The web server creates a database of assisted information and maps it geographically. When GNSS receivers, are operating under marginal conditions in poor visibility and low signal strength environments and don't have LAUNAG assistance within short-range wireless coverage, but do have a long range wireless capability such as GSM/UMTS and an associated internet connection, they are able to request assistance data from the web assistance server to help enable them to get a position and navigation fix. The web assistance server roughly locates the position of these receivers through mobile positioning techniques such as Cell ID and provides relevant assisted data from the database.

The basic functionality of such a WAUNAG arrangement may be as follows:

1. GNSS users in a good signal to noise ratio environment establish a connection to an assistance server and transmit assistance data with quality indexes to the assistance server.
2. The assistance server uses this assistance data, processes it, adds LBS (Location Based Services) data, forms geographically tagged assistance data and stores the results.
3. GNSS users in a low signal to noise environment send an assistance request signal to the assistance server.
4. The assistance server roughly estimates the requesting user's position, for example through mobile positioning or hotspot identification.
5. The assistance server uses the estimated position to retrieve suitable assistance data from its storage and transmits it back to the requesting GNSS user.
6. With the help of the assistance data, the user's GNSS receiver unit acquires and tracks satellites.
7. GNSS users form observations by decoding the assistance data message, applying error corrections and deriving positioning and navigational solutions.

Figure 13:
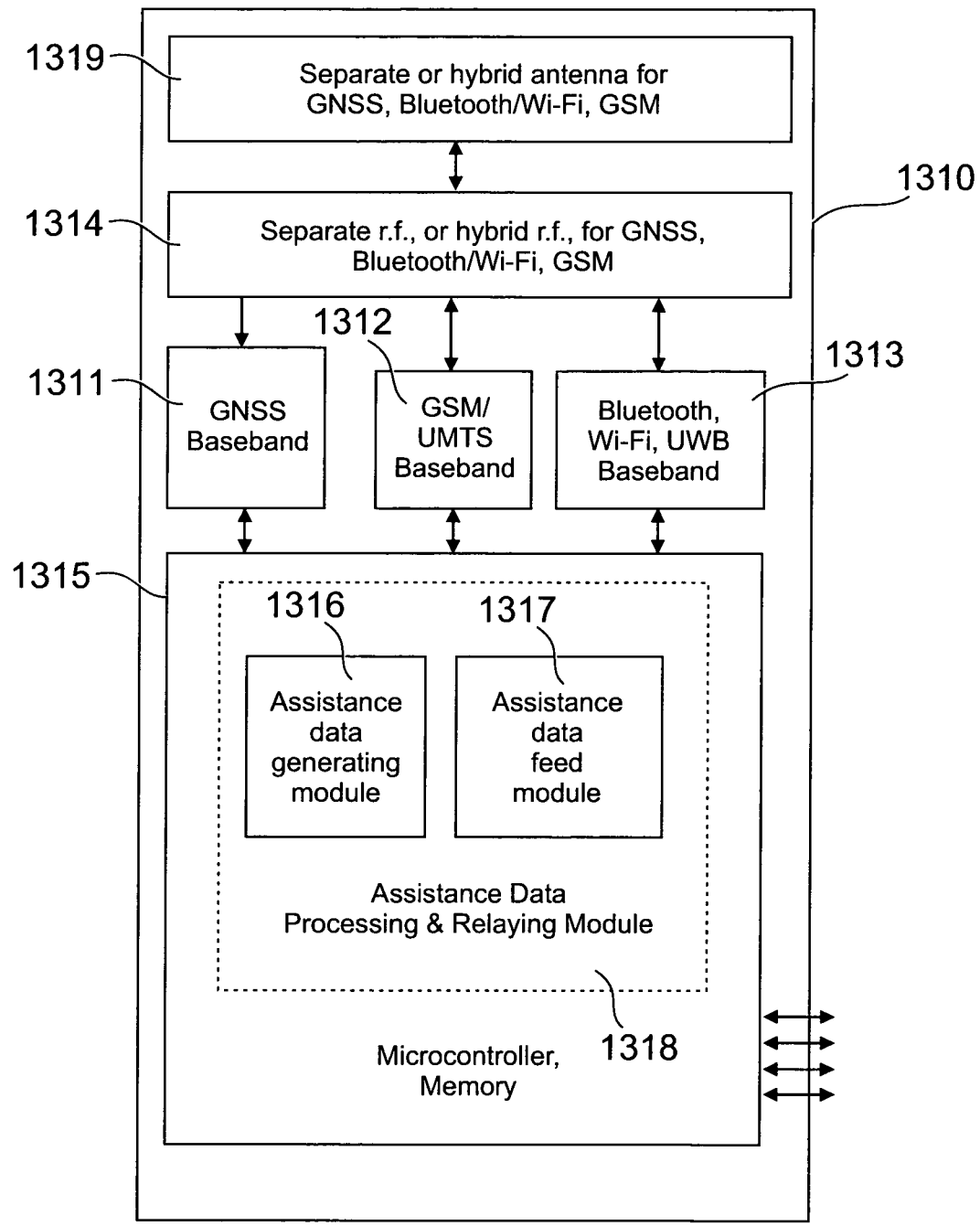
FIG. 13 illustrates in schematic form, the architecture of a GPS receiver unit in accordance with aspects of the present invention.

FIG. 13 illustrates the architecture of the relaying GPS receiver that is used for optimal performance, but commercially available receivers can also be used, with some modification in the architecture or integration with additional chips, circuits, add-on components or software modules to enable them to be used in accordance with the invention. The relaying GPS receiver is a relaying position determining unit. Here, the functionality of the assistance data processing and relaying module 1318 (software client) is implemented in microcontroller 1315 closely integrated with the software portion of a GPS solution.

The GNSS chip 1310 architecture shown here can be a single chip or multichip solution, and implements both LAUNAG and WAUNAG. The complete architecture comprises of multi-frequency GNSS baseband 1311, GSM or UMTS baseband 1312 for long range communication link in WAUNAG and short range baseband 1313 to provide LAUNAG capability. This short range baseband could be of Bluetooth or Wi-Fi or UWB or any future or current feasible technology suitable for short range communication. The architecture also incorporates separate or hybrid antennas 1319 and separate or hybrid R.F. front end 1314 of all the baseband mentioned above together with suitable microcontroller and memories 1315. The GNSS assistance data generating module 1316 and GNSS assistance data feed module 1317 are also shown in the assistance data processing and relaying module 1318. The assistance data generating module 1316 generates localised assistance data at the GPS receiver from the GNSS R.F. front end and/or GNSS baseband and/or microcontroller running GNSS solution's software portion which are the main modules of GPS positioning, timing and navigation unit. The assistance data processing and relaying module 1318 can also transmit the generated data to an assisted peer position determining unit. The assistance data feed module 1317 supplies assistance data to any combination of previously described main modules of relaying GPS positioning, timing and navigation unit. The supplied assistance data may originate in the assisting GPS receiver or the relaying GPS receiver itself.

A partial architecture is also possible, omitting the long range communications block, and therefore to provide only for LAUNAG functionality.

Further modifications and improvements may be added within the scope of the invention described by the claims herein.

The invention claimed is:

1. An assistance data processing and relaying module for a relaying position determining unit wherein the assistance data processing and relaying module is operable to obtain localised assistance data from an assisting peer position determining unit and is further operable to relay the localised assistance data to an assisted peer position determining unit, wherein the localised assistance data comprises non-GNSS (Global Navigation Satellite System) assistance data, and wherein the non-GNSS assistance data comprises Wireless Positioning System (WPS) assistance data which includes local Wireless Access Points' position information relative to the assisted and/or assisting peer position determining unit.

2. The assistance data processing and relaying module of claim 1, wherein the localised assistance data comprises GNSS assistance data.

3. The assistance data processing and relaying module of claim 1, wherein the localised assistance data comprises data derived from measurements by the assisting peer position determining unit in a locality of the assisted peer position determining unit.

4. The assistance data processing and relaying module of claim 1, wherein the assistance data processing and relaying module is operable to obtain the localised assistance data directly from the assisting peer position determining unit over a local wireless link.

5. The assistance data processing and relaying module of claim 1, wherein the assistance data processing and relaying module is operable to obtain the localised assistance data from the assisting peer position determining unit via an assistance server.

6. The assistance data processing and relaying module of claim 1, wherein the assistance data processing and relaying module is operable to relay the localised assistance data to the assisted peer position determining unit via an assistance server.

7. The assistance data processing and relaying module of claim 1, being operable to form a first peer to peer network with another peer position determining unit and to cause the other peer position determining unit to establish a second peer to peer network for the other peer position determining unit to obtain the localised assistance data.

8. The assistance data processing and relaying module of claim 1, further comprising an assistance data feed module operable to supply assistance data to a positioning, timing and navigation engine of the relaying position determining unit.

9. The assistance data processing and relaying module of claim 1, further comprising an assistance data generating module operable to generate additional localised assistance data at the relaying position determining unit.

10. The assistance data processing and relaying module of claim 9, being operable to transmit the generated additional localised assistance data to the assisted peer position determining unit.

11. The assistance data processing and relaying module of claim 9, wherein the generated additional localised assistance data comprises data derived from measurements performed by the relaying position determining unit.

12. The assistance data processing and relaying module of claim 9, being operable to transmit the generated additional localised assistance data to the assisted peer position determining unit over a local wireless link.

13. The assistance data processing and relaying module of claim 9, being operable to transmit the generated additional localised assistance data to the assisted peer position determining unit via an assistance server.

14. A position determining unit comprising the assistance data processing and relaying module of claim 1.

15. The position determining unit of claim 14, being operable to form a cluster with one or more peer position determining units in which the clustered position determining units exchange cluster assistance data with each other.

16. The position determining unit of claim 15, being operable to select preferred assistance data available within the cluster.

17. The position determining unit of claim 15, being operable to compare the generated additional localised assistance data with the cluster assistance data, to determine if the cluster assistance data may be enhanced and to cause the modification of the cluster assistance data responsive to the generated additional localised assistance data.

18. The position determining unit of claim 15, further operable to assume a special role in the cluster to arbitrate changes to the cluster assistance data.

19. The position determining unit of claim 18, wherein, in the special role, the position determining unit communicates assistance data with an assistance server.

20. The position determining unit of claim 18, being further operable to act as a repository for local geospatially relevant data.

21. A method of processing assistance data at a relaying position determining unit, the method comprising the steps of obtaining localised assistance data from an assisting peer position determining unit and relaying the localised assistance data to an assisted peer position determining unit, wherein the localised assistance data comprises non-GNSS assistance data, and wherein the non-GNSS assistance data comprises Wireless Positioning System (WPS) assistance data which includes local Wireless Access Points' position information relative to the assisted and/or assisting peer position determining unit.

22. The method of claim 21, wherein the localised assistance data comprises GNSS assistance data.

23. The method of claim 21, wherein the localised assistance data comprises data derived from measurements by the assisting peer position determining unit in a locality of the assisted peer position determining unit.

24. The method of claim 21, wherein the localised assistance data is obtained directly from the assisting peer position determining unit over a local wireless link.

25. The method of claim 21, wherein the localised assistance data is obtained from the assisting peer position determining unit via an assistance server.

26. The method of claim 21, wherein the localised assistance data is relayed to the assisted peer position determining unit via an assistance server.

27. The method of claim 21, further comprising the step of generating additional localised assistance data at the relaying position determining unit.

28. The method of claim 27, wherein the generated additional localised assistance data comprises data derived from measurements performed by the relaying position determining unit.

29. The method of claim 27, further comprising the step of transmitting the generated additional localised assistance data from the relaying position determining unit to the assisted peer position determining unit.

30. The method of claim 29, wherein the step of transmitting the generated additional localised assistance data comprises transmitting from the relaying position determining unit to the assisted peer position determining unit over a local wireless network link.

31. The method of claim 29, wherein the step of transmitting the generated additional localised assistance data comprises transmitting from the relaying position determining unit to the assisted peer position determining unit via an assistance server.

32. A method of exchanging assistance data comprising the steps of forming a cluster of a plurality of peer position determining units and exchanging cluster assistance data between the clustered position determining units in accordance with the method of claim 21.

33. The method of claim 32, further comprising the step of selecting preferred assistance data available within the cluster for a clustered position determining unit.

34. The method of claim 32, further comprising the step of comparing localised assistance data generated by a clustered position determining unit with the cluster assistance data, to determine if the cluster assistance data may be enhanced and to cause the modification of the cluster assistance data responsive to the generated localised assistance data.

35. The method of claim 32, further comprising the step of operating a position determining unit to assume a special role in the cluster to arbitrate changes to the cluster assistance data.

36. The method of claim 35, further comprising the step of the position determining unit operated in the special role communicating assistance data with an assistance server.

37. The method of claim 35, further comprising the step of operating the position determining unit as a repository for local geospatially relevant data.

38. An assistance data receiving module for an assisted position determining unit wherein the assistance data receiving module is operable to obtain localised assistance data from an assisting peer position determining unit via an assistance server, wherein the localised assistance data comprises non-GNSS assistance data, and wherein the non-GNSS assistance data comprises Wireless Positioning System (WPS) assistance data which includes local Wireless Access Points' position information relative to the assisted and/or assisting peer position determining unit.

39. The assistance data receiving module of claim 38, wherein the localised assistance data comprises GNSS assistance data.

40. The assistance data receiving module of claim 38, wherein the localised assistance data comprises data derived from measurements by the assisting peer position determining unit in a locality of the assisted position determining unit.

41. An assistance data transmitting module for an assisting position determining unit wherein the assistance data transmitting module is operable to develop localised assistance data and to transmit the localised assistance data to an assisted peer position determining unit via an assistance server, wherein the localised assistance data comprises non-GNSS assistance data, and wherein the non-GNSS assistance data comprises Wireless Positioning System (WPS) assistance data which includes local Wireless Access Points' position information relative to the assisted and/or assisting peer position determining unit.

42. The assistance data transmitting module of claim 41, wherein the localised assistance data comprises GNSS assistance data.

43. The assistance data transmitting module of claim 41, wherein the localised assistance data comprises data derived from measurements performed by the assisting position determining unit.

44. A server module for a server, wherein the server module is operable to receive localised assistance data from a plurality of mobile assisting position determining units each having the assistance data transmitting module according to claim 41.

45. The server module of claim 44, being operable to select suitable localised assistance data for transmission to the assisted position determining unit in case of localised assistance data reception from a multiplicity of the assisting position determining units.

46. The server module of claim 44, being operable to provide and/or enable location based services responsive to the received localised assistance data.

47. A position determining unit comprising the assistance data receiving module of claim 38.

48. The position determining unit of claim 47, wherein the position determining unit is a GNSS roving receiver.

49. The position determining unit of claim 47, wherein the position determining unit is a personal mobile device.

50. The position determining unit of claim 47, being operable to form a cluster with one or more peer position determining units in which the clustered position determining units exchange cluster assistance data with each other.

51. The position determining unit of claim 50, being operable to select preferred assistance data available within the cluster.

52. The position determining unit of claim 50, being operable to compare the localised assistance data the positioning determining unit has developed with the cluster assistance data, to determine if the cluster assistance data may be enhanced and to cause the modification of the cluster assistance data responsive the localised assistance data it has developed.

53. The position determining unit of claim 50, being further operable to assume a special role in the cluster to arbitrate changes to the cluster assistance data.

54. The position determining unit of claim 53, wherein, in the special role, the position determining unit communicates assistance data with an assistance server.

55. The position determining unit of claim 53, being further operable to act as a repository for local geospatially relevant data.

56. A method of receiving assistance data at an assisted position determining unit comprising the step of obtaining localised assistance data from an assisting peer position determining unit via an assistance server, wherein the localised assistance data comprises non-GNSS assistance data, and wherein the non-GNSS assistance data comprises Wireless Positioning System (WPS) assistance data which includes local Wireless Access Points' position information relative to the assisted and/or assisting peer position determining unit.

57. The method of claim 56, wherein the localised assistance data comprises GNSS assistance data.

58. The method of claim 56, wherein the localised assistance data comprises data derived from measurements by the assisting peer position determining unit in a locality of the assisted peer position determining unit.

59. A method of providing assistance data from a transmitting position determining unit, the method comprising the steps of developing localised assistance data and transmitting the localised assistance data from the transmitting position determining unit to an assisted peer position determining unit via an assistance server, wherein the localised assistance data comprises non-GNSS assistance data, and wherein the non-GLASS assistance data comprises Wireless Positioning System (WPS) assistance data which includes local Wireless Access Points' position information relative to the assisted peer position determining unit and/or the transmitting position determining unit.

60. The method of claim 59, wherein the localised assistance data comprises GNSS assistance data.

61. The method of claim 59, wherein the localised assistance data comprises data derived from measurements performed by the transmitting position determining unit.

62. A method of exchanging assistance data comprising the steps of forming a cluster of a plurality of peer position determining units and exchanging cluster assistance data between the clustered position determining units in accordance with the method of claim 56.

63. The method of claim 62 further comprising the step of selecting preferred assistance data available within the cluster for a clustered position determining unit.

64. The method of claim 62, further comprising the step of comparing the localised assistance data developed by a clustered position determining unit with the cluster assistance data, to determine if the cluster assistance data may be enhanced and to cause the modification of the cluster assistance data responsive the developed localised assistance data.

65. The method of claim 62, further comprising the step of operating a position determining unit to assume a special role in the cluster to arbitrate changes to the cluster assistance data.

66. The method of claim 65, further comprising the step of the position determining unit operated in the special role communicating assistance data with an assistance server.

67. The method of claim 65 further comprising the step of operating the position determining unit as a repository for local geospatially relevant data.

68. A non-transitory computer-readable medium storing instructions for processing assistance data at a relaying position determining unit, the instructions being adapted to cause one or more processors to perform the method according to claim 21.

69. A non-transitory computer-readable medium storing instructions for exchanging assistance data, the instructions being adapted to cause one or more processors to perform the method according to claim 32.

70. A non-transitory computer-readable medium storing instructions for receiving assistance data at an assisted position determining unit, the instructions being adapted to cause one or more processors to perform the method according to claim 56.

71. A non-transitory computer-readable medium storing instructions for providing assistance data from a transmitting position determining unit, the instructions being adapted to cause one or more processors to perform the method according to claim 59.

72. A non-transitory computer-readable medium storing instructions for exchanging assistance data, the instructions being adapted to cause one or more processors to perform the method according to claim 62.

73. The assistance data processing and relaying module of claim 1, wherein the non-GNSS assistance data comprises a database of local Wireless Access Points' position information relative to the assisted and/or assisting peer position determining unit.

74. The method of claim 21, wherein the non-GNSS assistance data comprises a database of local Wireless Access Points' position information relative to the assisted and/or assisting peer position determining unit.

75. The assistance data receiving module of claim 38, wherein the non-GNSS assistance data comprises a database of local Wireless Access Points' position information relative to the assisted and/or assisting peer position determining unit.

76. The assistance data transmitting module of claim 41, wherein the non-GNSS assistance data comprises a database of local Wireless Access Points' position information relative to the assisted and/or assisting peer position determining unit.

77. The method of claim 56, wherein the non-GNSS assistance data comprises a database of local Wireless Access Points' position information relative to the assisted and/or assisting peer position determining unit.

78. The method of claim 59, wherein the non-GNSS assistance data comprises a database of local Wireless Access Points' position information relative to the assisted peer position determining unit and/or the transmitting position determining unit.

79. An assistance data processing and relaying module for a relaying position determining unit wherein the assistance data processing and relaying module is operable to obtain localised assistance data from an assisting peer position determining unit and is further operable to relay the localised assistance data to an assisted peer position determining unit, wherein the localised assistance data comprises non-GNSS assistance data, and wherein the non-GNSS assistance data comprises a database of local Wireless Access Points' position information relative to the assisted and/or assisting peer position determining unit.

* * * * *